(12) United States Patent
Andrade et al.

(10) Patent No.: US 7,725,877 B2
(45) Date of Patent: *May 25, 2010

(54) GRAPHICAL PROGRAM WHICH INCLUDES AN I/O NODE FOR HARDWARE ABSTRACTION

(75) Inventors: Hugo A. Andrade, Austin, TX (US); Matthew E. Novacek, Austin, TX (US); Lukasz T. Darowski, Urbandale, IA (US)

(73) Assignee: National Instruments Corporation, Austin, TX (US)

( * ) Notice: Subject to any disclaimer, the term of this patent is extended or adjusted under 35 U.S.C. 154(b) by 1522 days.

This patent is subject to a terminal disclaimer.

(21) Appl. No.: 10/997,504

(22) Filed: Nov. 24, 2004

(65) Prior Publication Data

US 2005/0155014 A1      Jul. 14, 2005

Related U.S. Application Data

(60) Provisional application No. 60/535,248, filed on Jan. 9, 2004.

(51) Int. Cl.
*G06F 9/44* (2006.01)

(52) U.S. Cl. ........................... 717/110; 717/107

(58) Field of Classification Search ............ None
See application file for complete search history.

(56) References Cited

U.S. PATENT DOCUMENTS

| | | | |
|---|---|---|---|
| 5,301,301 A * | 4/1994 | Kodosky et al. .......... 716/11 |
| 5,481,741 A | 1/1996 | McKaskle et al. |
| 6,526,566 B1 | 2/2003 | Austin |
| 7,213,207 B2 * | 5/2007 | Rogers et al. .......... 715/734 |
| 7,216,334 B2 * | 5/2007 | Kodosky et al. .......... 717/109 |
| 2001/0020291 A1 | 9/2001 | Kudukoli et al. |
| 2001/0034879 A1 | 10/2001 | Washington et al. |
| 2001/0034881 A1 | 10/2001 | Washington |
| 2001/0035879 A1 | 11/2001 | Washington et al. |
| 2002/0109726 A1 | 8/2002 | Rogers et al. |
| 2003/0172369 A1 | 9/2003 | Kodosky et al. |
| 2005/0155015 A1 | 7/2005 | Novacek |
| 2005/0177816 A1 * | 8/2005 | Kudukoli et al. .......... 717/105 |

OTHER PUBLICATIONS

U.S. Appl. No. 09/518,492, entitled "System and method for programmatically creating a graphical program", filed Mar. 3, 2000, by Kudukoli, et al.

* cited by examiner

*Primary Examiner*—Jason Mitchell
(74) *Attorney, Agent, or Firm*—Meyertons Hood Kivlin Kowert & Goetzel, P.C.; Jeffrey C. Hood

(57) ABSTRACT

A system and method for creating a graphical program utilizing one or more input/output (I/O) nodes. An I/O node may be displayed in a first graphical program, where the I/O node may include associated generation code for programmatically generating execution-time code associated with the I/O node in the first graphical program. First input may be received to select a first I/O source or target corresponding to the first I/O node, e.g., from various supported hardware resources, and the associated generation code may be executed to programmatically generate or modify the execution-time code, e.g., at compilation or prior to execution of the first graphical program, to provide I/O to or from the first I/O source or target.

19 Claims, 29 Drawing Sheets

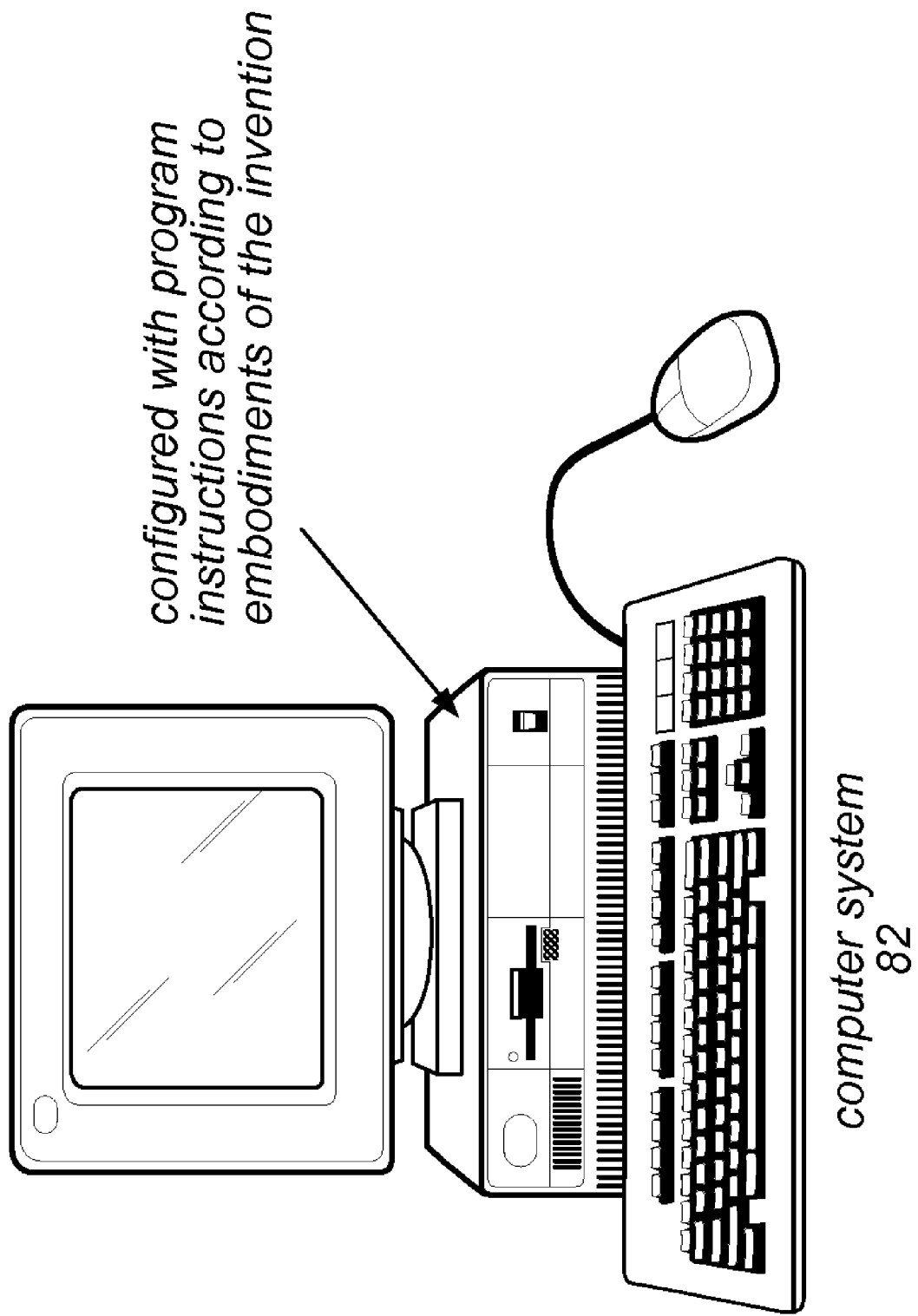

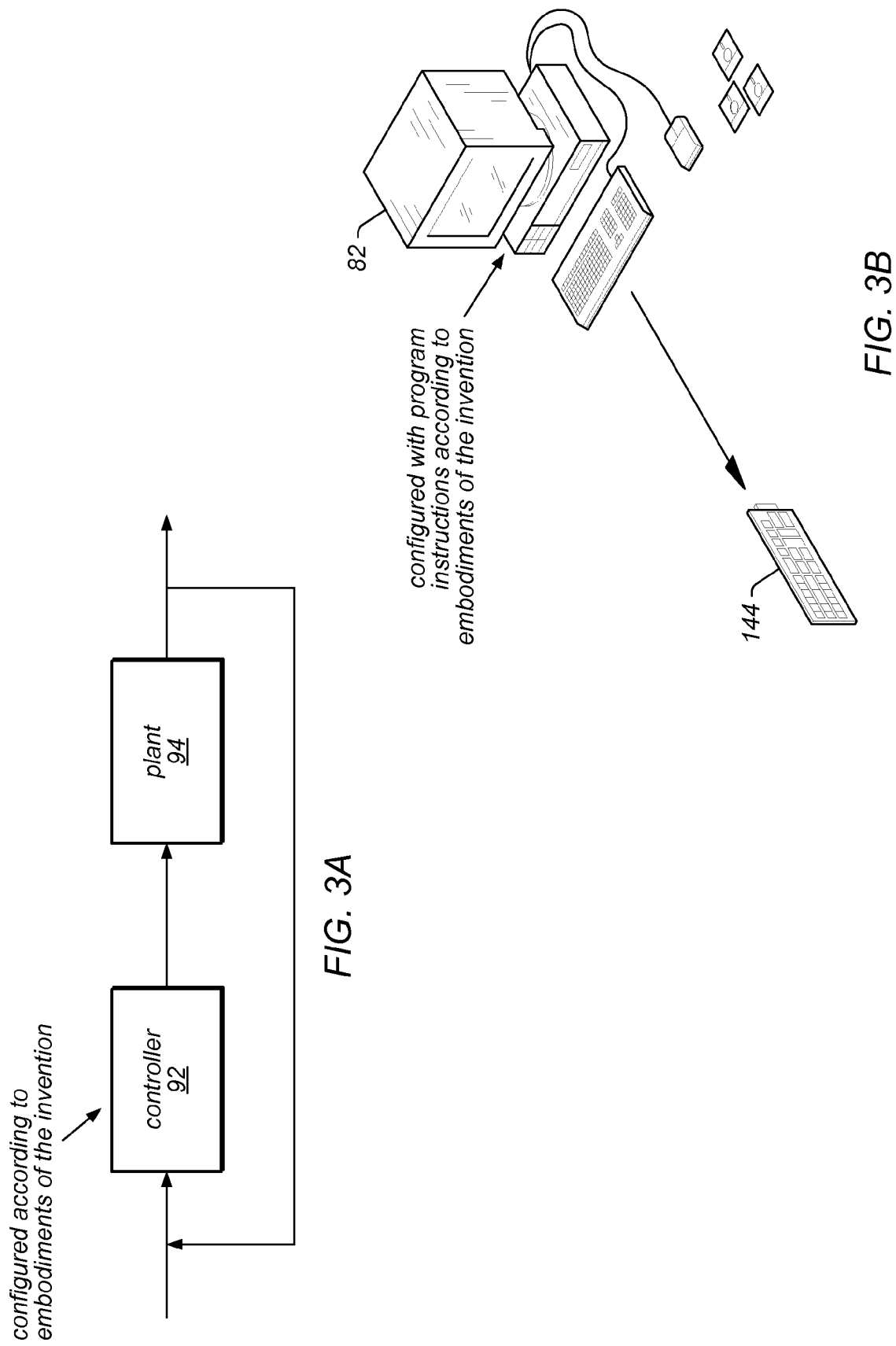

Execution Engine

|  |  | PC | RT | FPGA |
|---|---|---|---|---|
| IO Module | DAQ | ○ | ○ | ⊠ |
|  | uDAQ | ○ | ○ | ○ |
|  | FPGA_IO | N | N | ○ |

IO Type: AIN, AOUT ...

○ Native class – execution engine supports IO module directly
N Network class – execution engine connects to IO module through LV-LV communication
⊠ No class – execution engine doesn't support IO module

GRAPHICAL PROGRAM WHICH INCLUDES AN I/O NODE FOR HARDWARE ABSTRACTION

PRIORITY DATA

This application claims benefit of priority of U.S. provisional application Ser. No. 60/535,248, titled "A Graphical Program Which Includes an I/O Node for Hardware Abstraction," filed Jan. 9, 2004, whose inventors are Matthew Novacek and Lucas Dorowski.

FIELD OF THE INVENTION

The present invention relates to the field of graphical programming, and more particularly to a system and method for creating a graphical program utilizing one or more input/output (I/O) nodes.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

SUMMARY

A system and method for I/O abstraction may allow users to create graphical programs that are hardware independent through I/O abstraction. In one embodiment, I/O abstraction is a mechanism that allows the use of a generic I/O node in a block diagram that may be executing in different targets. The system and method for I/O abstraction may permit users to change physical I/O resources without modifying their graphical programs.

One embodiment of the present invention comprises a system and method for enabling a graphical program to use an input/output (I/O) node for hardware abstraction. The graphical program may include a plurality of interconnected nodes that visually indicate functionality of the graphical program. The graphical program may have one or more of a data flow, control flow, and/or execution flow representation.

A first node, also referred to as an I/O abstraction node or I/O node (or generic I/O node), may be included or displayed in the graphical program. The I/O node includes associated generation code for programmatically generating execution-time code associated with the I/O node. The generation code generally executes prior to execution of the graphical program. In other words, the generation code generally does not execute at execution-time of the graphical program, but rather typically operates prior to graphical program execution. The generation code may operate at various times, such as design-time, edit-time, and/or compile-time, to programmatically generate the execution-time code. The execution-time code that is programmatically generated typically executes at graphical program execution time when the I/O node is executed in the graphical program.

The generation code associated with the I/O node may programmatically generate or modify the execution-time code based on or in response to any of various factors. The generation code may be operable to programmatically generate different types of execution-time code for the I/O node. In one embodiment, input to edit (e.g., create or modify) the graphical program may be received, and the generation code may operate to programmatically generate or modify first execution-time code based on the input. The input to edit the graphical program may include a selection of an I/O resource (e.g., a source or target) corresponding to the I/O node. The programmatically generated first execution-time code may be associated with the I/O node in the graphical program in which the I/O node is included. In another embodiment, the execution-time code may be programmatically generated or modified based on code generation dependency information, wherein the code generation dependency information may include any kind of information from any source.

In various embodiments, the generation code associated with the I/O node may execute to programmatically generate or modify the execution-time code for the I/O node at various times, such as when a graphical program including the I/O node is being edited, when the graphical program is being compiled, just prior to execution of the graphical program, when the graphical program is opened for editing, etc.

In various embodiments, the execution-time code that is programmatically generated or modified by the generation code may include code of any kind, and the code may be associated with the I/O node in any of various ways. In one embodiment, programmatically generating the execution-time code may comprise programmatically generating an execution-time block diagram or programmatically generating graphical execution-time code, wherein the execution-time block diagram or graphical code is associated with the I/O node in the graphical program. In another embodiment, programmatically generating the execution-time code may comprise programmatically generating text-based code.

Once the graphical program has been created, the graphical program may be executed. Executing the graphical program may include executing the programmatically generated execution-time code associated with the I/O node. For example, when the I/O node is scheduled to execute, the programmatically generated execution-time code associated with the I/O node may execute to perform I/O to the selected I/O resource associated with the I/O node.

The generic I/O node described herein allows the user to create a graphical program for various I/O targets or interfaces without having to be concerned with the type of I/O target or interface.

BRIEF DESCRIPTION OF THE DRAWINGS

A better understanding of the present invention can be obtained when the following detailed description of the preferred embodiment is considered in conjunction with the following drawings, in which:

FIG. 1A illustrates a computer system operable to execute a graphical program according to an embodiment of the present invention;

FIG. 3A is a high level block diagram of an exemplary system which may execute or utilize graphical programs;

FIG. 3B illustrates an exemplary system which may perform control and/or simulation functions utilizing graphical programs;

Figure 1B:
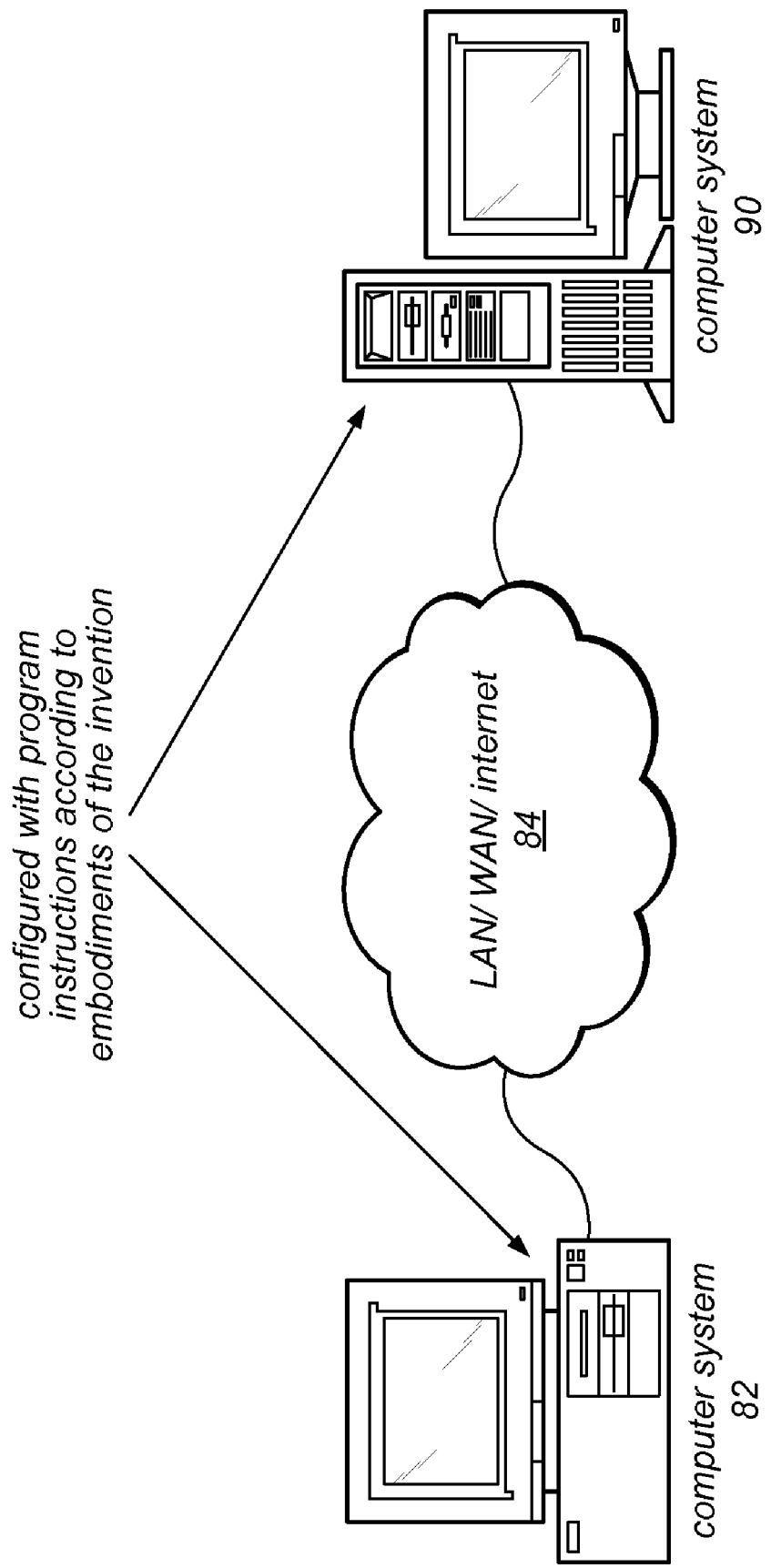
FIG. 1B illustrates a network system comprising two or more computer systems that may implement an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 20030172369 (Ser. No. 10/094,198) titled "Self-Determining Behavior Node for Use in Creating a Graphical Program" filed Mar. 8, 2002.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, Vis Sim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, Vis Sim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to execute a graphical program configured to provide hardware abstraction. One embodiment of a method for creating a graphical program operable to provide hardware abstraction is described below.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
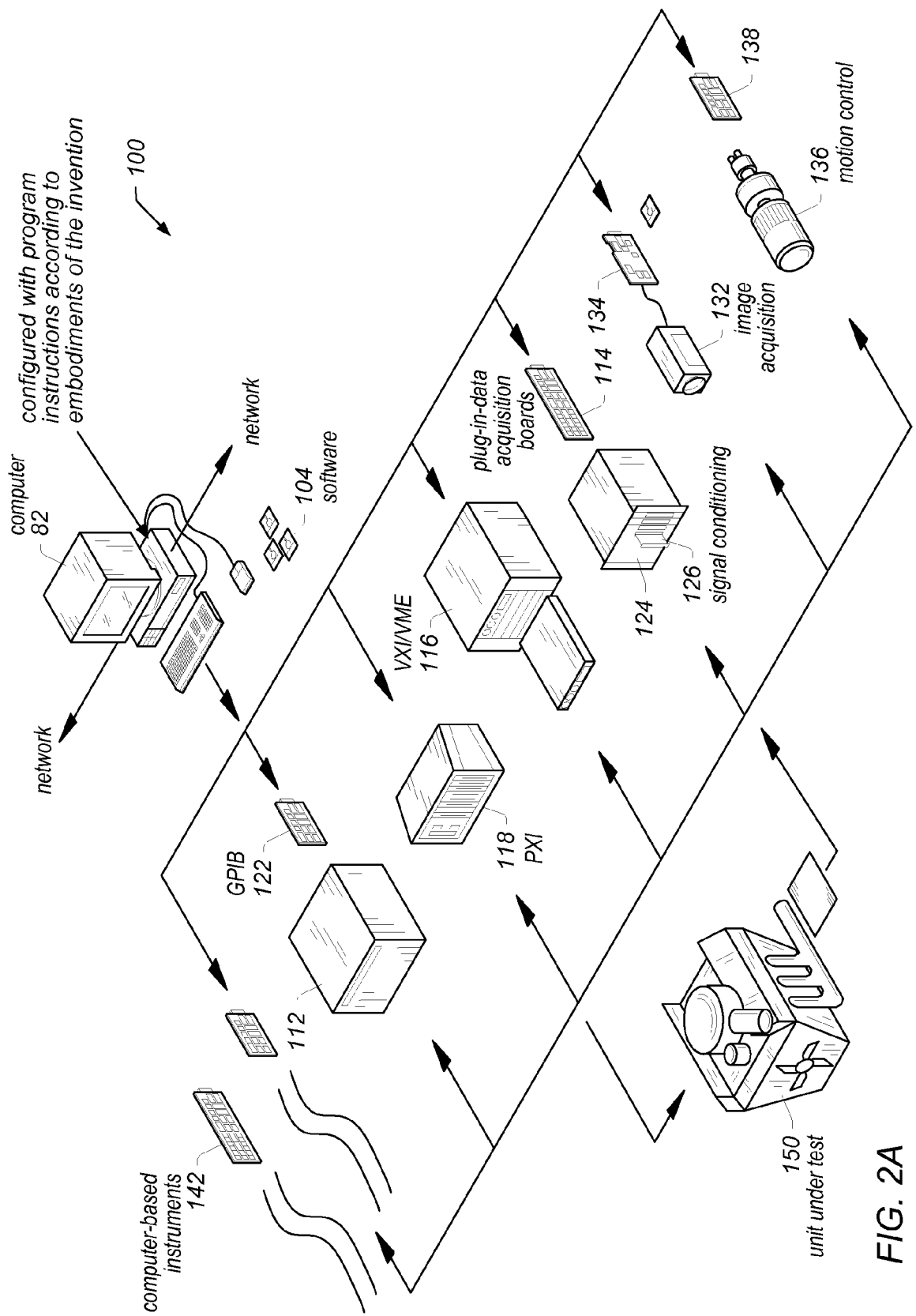
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
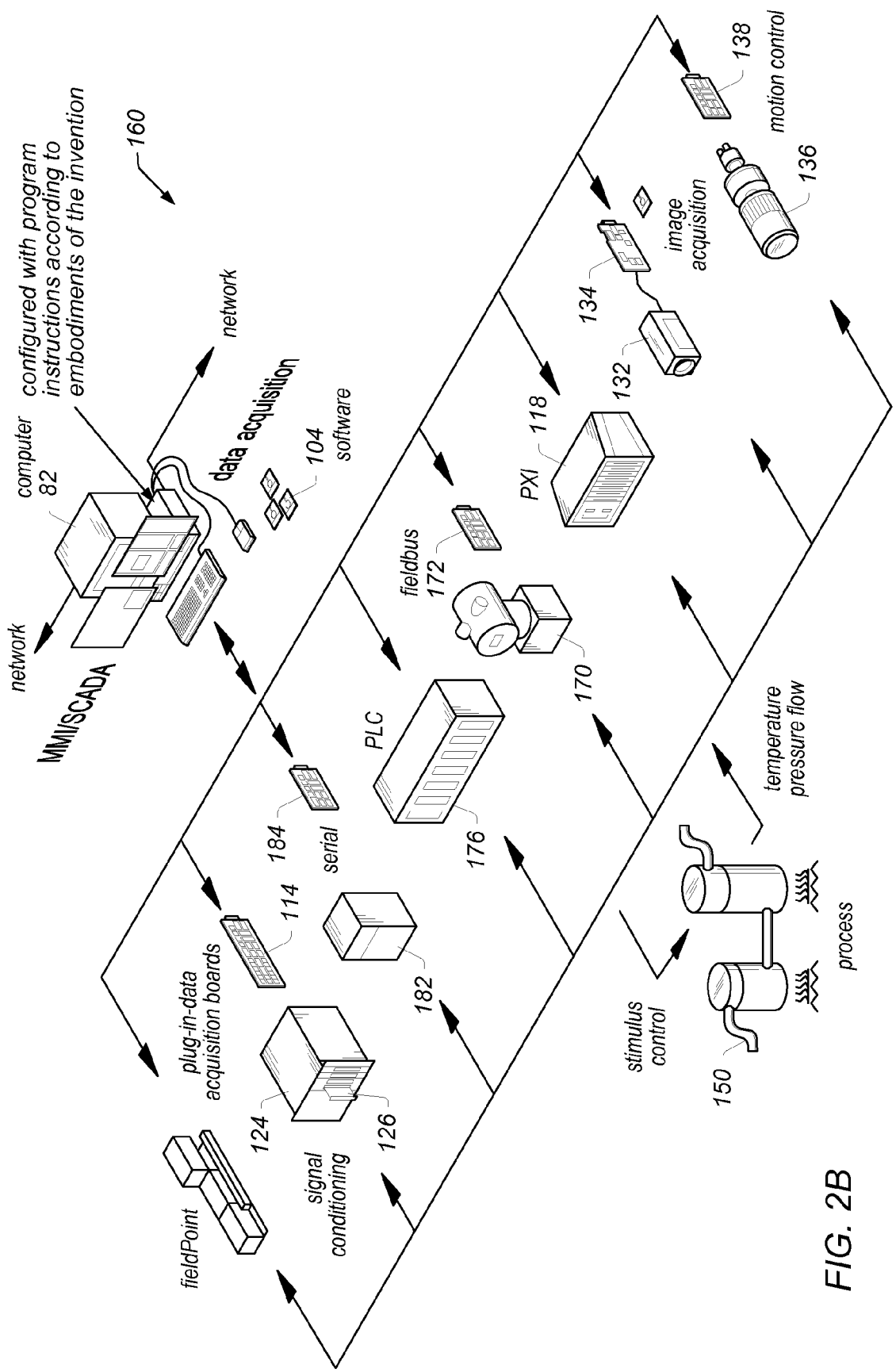
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 3C:
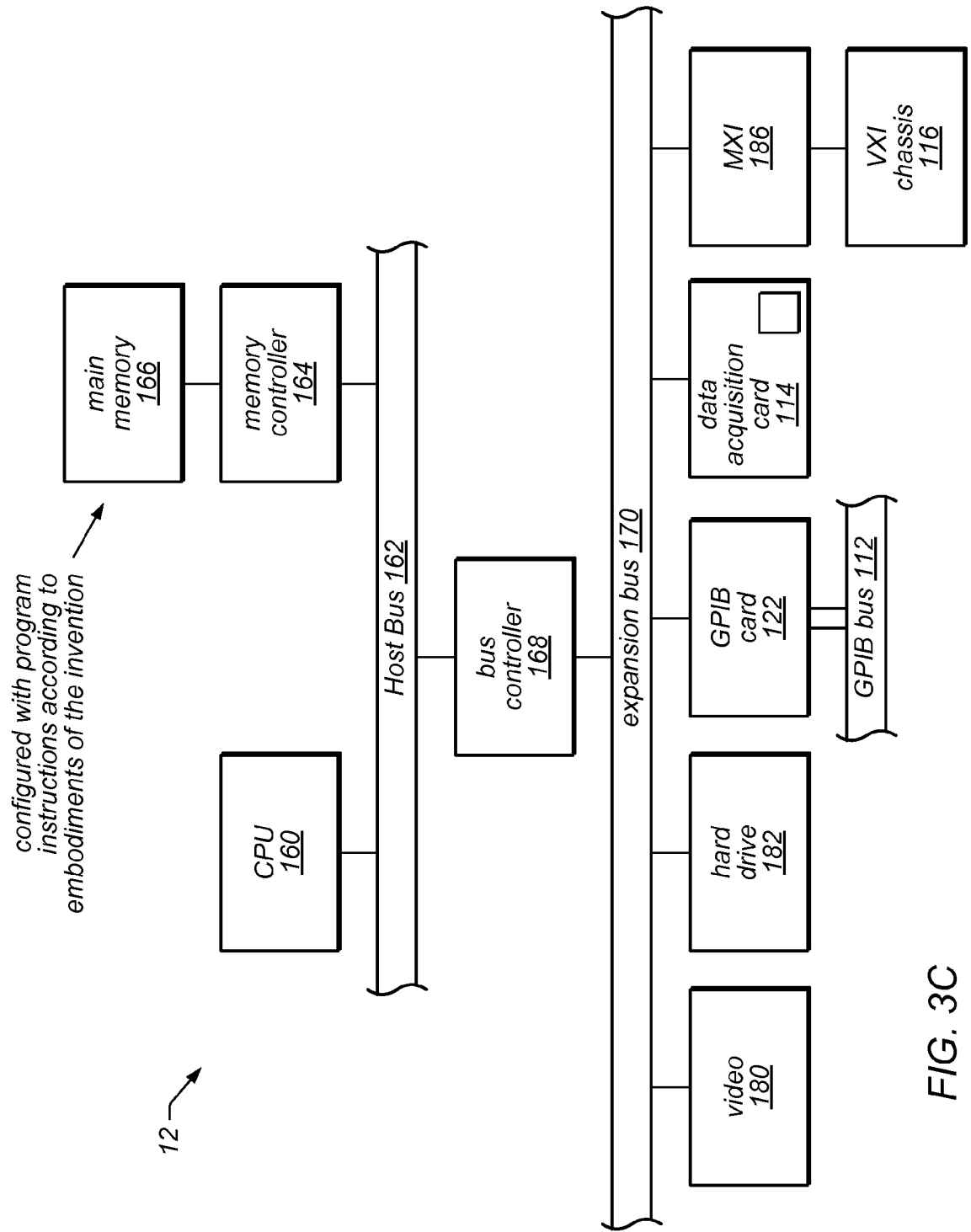
FIG. 3C is an exemplary block diagram of the computer systems of FIGS. 1A, 1B, 2A and 2B and 3B.

FIG. 3C—Computer System Block Diagram

FIG. 3C is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 3C illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program operable to provide hardware abstraction. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

FIGS. 4-8: Self-Determining Behavior (SDB) Node

FIGS. 4-8 illustrate various exemplary embodiments of a self-determining behavior (SDB) node 200. The SDB node 200 may be a node for inclusion in a graphical program, e.g., for connection to other nodes in the graphical program. The SDB node 200 may have zero or more input terminals 202 to which inputs for the SDB node 200 may be connected. For example, the user may connect or wire an output terminal of another node in the graphical program to an input terminal 202 of the SDB node 200, or the user may connect other types of inputs to the input terminals, such as constant values. Also, the SDB node 200 may have zero or more output terminals 204 from which outputs produced or propagated by the SDB node 200 may be provided to other portions of the graphical program. For example, the user may connect or wire an output terminal of the SDB node 200 to an input terminal of another node in the graphical program or to another element of the graphical program.

Each node in a graphical program typically has associated execution-time code which is executed when the graphical program is executed (or which may execute, depending on dynamically determined factors such as conditions evaluated during execution of the graphical program). In other words, a node in a graphical program typically represents some functionality, and the execution-time code associated with the node executes during execution of the graphical program to perform this functionality. For example, as the graphical program is executed, nodes in the graphical program may be scheduled to execute, i.e., the execution-time code of these nodes may be scheduled to execute. The technique used to schedule the execution of the nodes may depend on the particular graphical programming development environment used to create the graphical program or the underlying implementation of the graphical program, such as whether the graphical program utilizes data flow, control flow, and/or execution flow. Block 210 in FIG. 4 illustrates the execution-time code associated with the SDB node 200.

Figure 4:
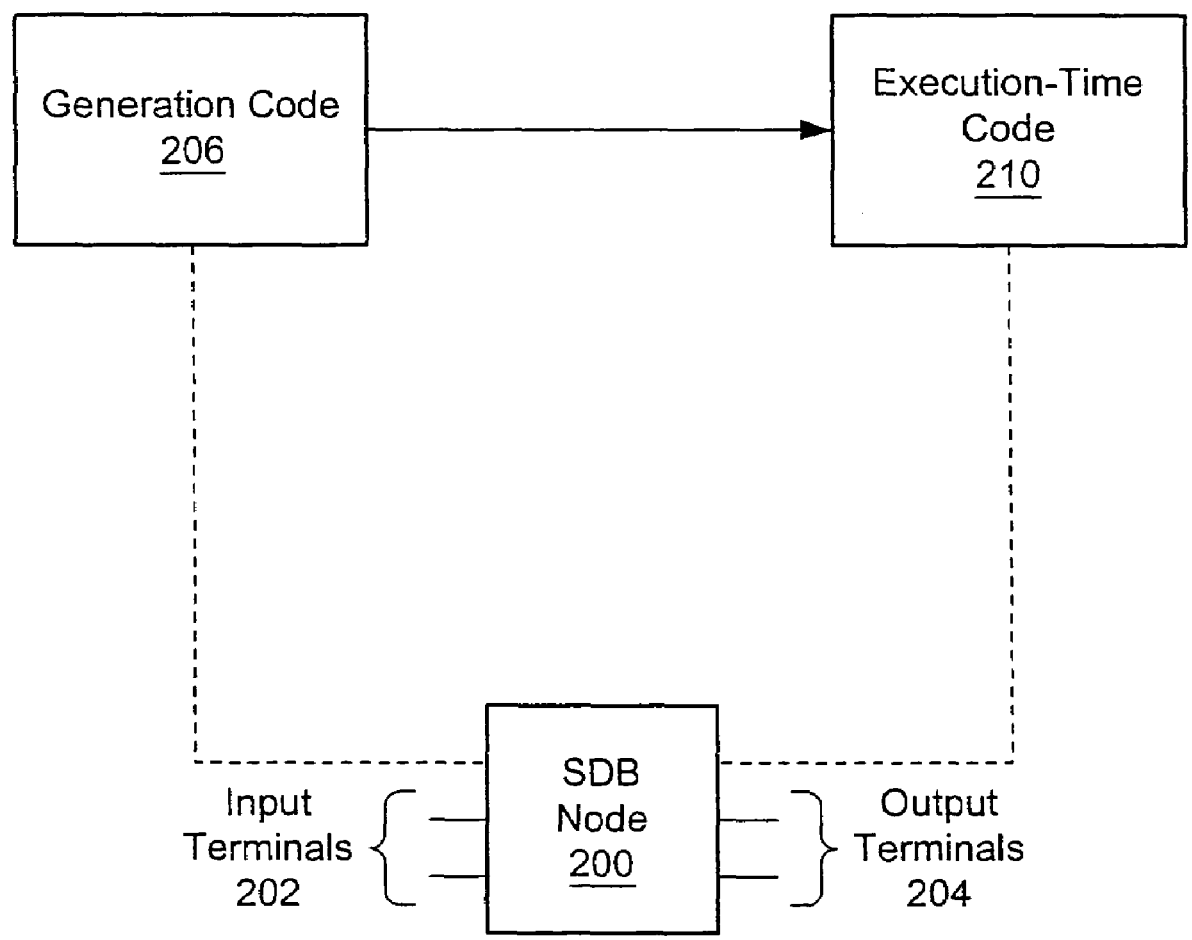
FIGS. 4-8 illustrate various exemplary embodiments of a self-determining behavior (SDB) node.

As shown in FIG. 4, the SDB node 200 may also have associated generation code 206. The generation code 206 may be operable to programmatically generate or modify the execution-time code 210. Programmatically generating or modifying the execution-time code 210 may include automatically generating or modifying the execution-time code without receiving user input during the generation or modification process. In one embodiment, when the SDB node 200 is initially displayed or included in a graphical program, the SDB node 200 may not yet have any execution-time code 210 or may have essentially empty or placeholder execution-time code 210. In this case, the generation code 206 may execute to programmatically or automatically generate the execution-time code 210 for the SDB node 200 after the SDB node 200 has been included in the graphical program. Thus, the execution functionality of the SDB node 200 may be determined by the execution-time code 210 generated by the generation code 206. In another embodiment, when the SDB node 200 is initially displayed or included in the graphical program, the SDB node 200 may have default execution-time code 210. In this case, the generation code 206 may execute to programmatically or automatically modify the execution-time code 210 or to re-generate the execution-time code 210.

The generation code 206 may be operable to programmatically generate different types of execution-time code 210 in response to or based on any of various factors. For example, the generated execution-time code 210 may have different functionality depending on these factors. In one embodiment, the actual execution-time code 210 that is generated, or the manner in which existing execution-time code 210 is modified, may depend on input received. For example, the generation may depend on user input received to edit the graphical program and/or user input received to a graphical programming development environment application used to create the graphical program. In other embodiments, the generation of the execution-time code 210 may depend on code generation dependency information, wherein the code generation dependency information may include information of any kind and from any source. Examples of various factors that may influence the generation of the execution-time code 210 are discussed in further detail below.

In various embodiments, the execution-time code 210 programmatically generated or modified by the generation code 206 may include code of any kind, and the code may be associated with the SDB node 200 in any of various ways. In one embodiment, the generated execution-time code 210 may include text-based code. In another embodiment, the generated execution-time code 210 may include graphical code, wherein the graphical code may include a plurality of interconnected nodes which, when displayed, visually indicate functionality of the execution-time code 210. For example, generating the execution-time code 210 may include generating an execution-time block diagram associated with the SDB node 200. Thus, a block diagram specifying execution functionality of the SDB node 200 may be programmatically or automatically generated. The resulting block diagram may be a block diagram much the same as a block diagram manually created by a user. For example, many graphical programming development environments enable a user to create a sub-program node and create a block diagram or graphical code specifying execution functionality of the sub-program node. In one embodiment, the programmatically generated block diagram may itself include one or more instances of an SDB node, e.g., instances of the SDB node that generated the block diagram and/or instances of other SDB nodes.

In one embodiment, the generated execution-time code 210 may subsequently be converted to another form before being executed, such as machine language code. In another embodiment, machine language code may be directly generated.

In one embodiment, the generated execution-time code 210 may be displayed to the user, either automatically or in response to a user request to view the code. In another embodiment, the graphical programming development environment may not allow the user to view the generated execution-time code 210 associated with an SDB node 200.

In various embodiments, the generation code 206 may also include code of any kind, and the code may be associated with the SDB node 200 in any of various ways. In one embodiment, the generation code 206 may include text-based code. In another embodiment, the generation code 206 may include graphical code, wherein the graphical code may include a plurality of interconnected nodes which, when displayed, visually indicate functionality of the generation code 206. For example, the generation code 206 may be included on a block diagram, referred to herein as a node behavior characterization block diagram. Thus, in one embodiment, in addition to having an associated execution-time block diagram, the SDB node 200 may also have a node behavior characterization block diagram. The node behavior characterization block diagram may include the generation code 206, which may be operable to programmatically generate the execution-time block diagram. However, while the execution-time block diagram may execute during execution of the graphical program, the node behavior characterization block diagram may execute at design-time of the graphical program, e.g., as the graphical program is being edited. In one embodiment, the node behavior characterization block diagram may itself include one or more instances of an SDB node.

Figure 5:
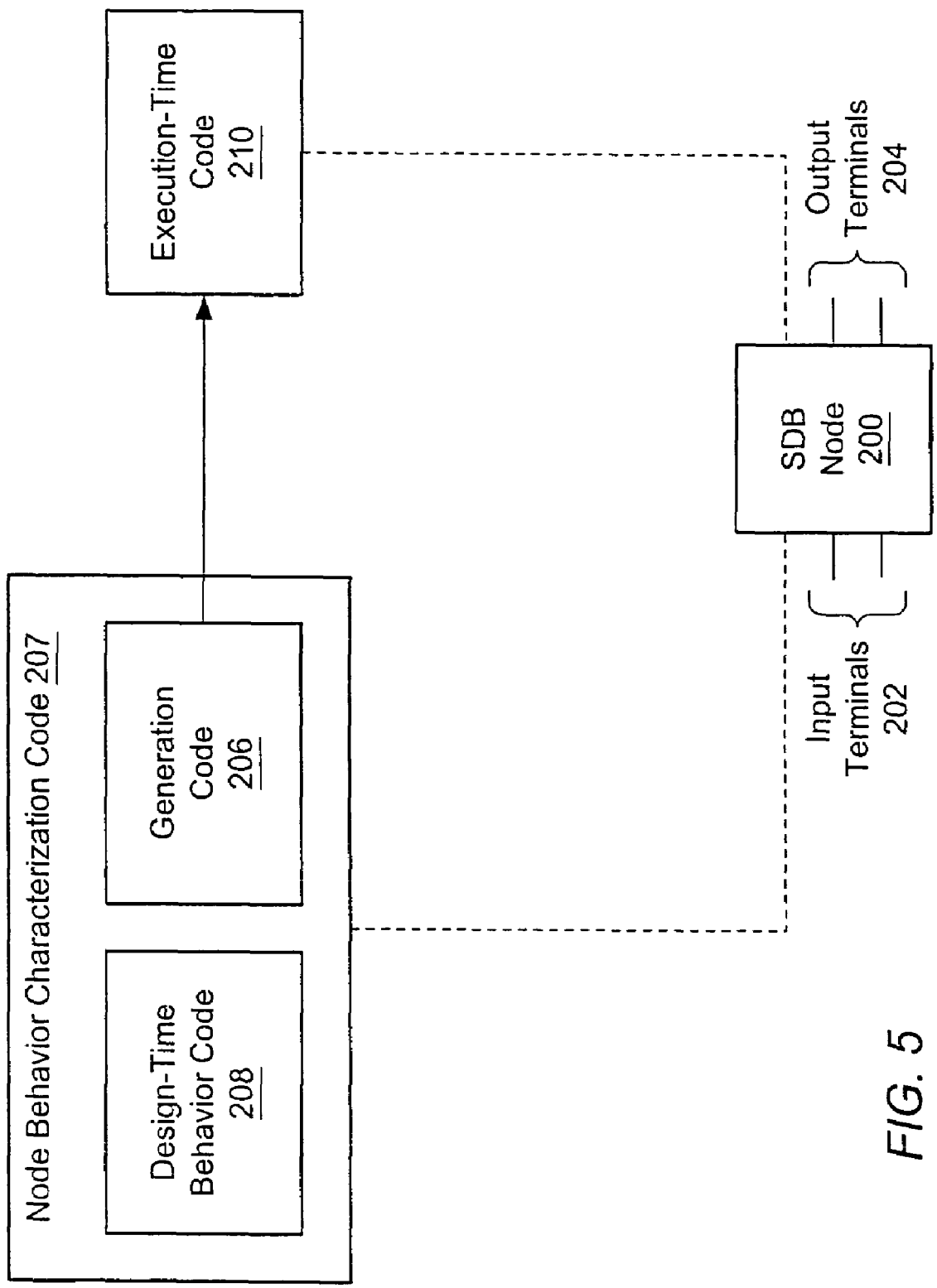

As shown in FIG. 5, in one embodiment, the SDB node 200 may also have design-time behavior code 208. The design-time behavior code 208 may be operable to affect design-time behavior of the SDB node 200. As used herein, the term "design-time" may refer to states when a graphical program including the SDB node 200 is not being executed. For example, design-time may include a state in which the graphical program is currently being edited, such as when the graphical programming development environment is currently displaying a main block diagram of the graphical program and is ready to receive user input specifying edits to the main block diagram. Design-time may also include other states in which the graphical program is not being edited per se. For example, design-time may include a state in which the graphical programming development environment has been launched, but the graphical program itself has not been opened for editing and is not being executed. The term "edit-time" may refer to a state in which the graphical program is currently being edited. For example, edit-time may include a state in which the graphical programming development environment is receiving or is ready to receive user input to edit or create the graphical program.

In various embodiments, the design-time behavior code 208 may affect any of various aspects of the design-time behavior of the SDB node 200. For example, the design-time behavior code 208 may affect a user's experience of interacting with the SDB node 200 when editing the graphical program. The design-time behavior code 208 may execute in response to any of various conditions or events. In one embodiment, the design-time behavior code 208 may execute in response to user input received, such as user input to edit the graphical program. Various examples of actions which may be performed by the design-time behavior code 208 and conditions which may cause the design-time behavior code 208 to execute are described below.

Similarly as described above with respect to the generation code 206, the design-time behavior code 208 may include any of various types of code, such as graphical code and/or text-based code. Also, in various implementations, the design-time behavior code 208 may be associated with the SDB node 200 in any of various ways.

As shown in FIG. 5, in one embodiment the design-time behavior code 208 may be packaged together with the generation code 206. In this case, the design-time behavior code 208 and the generation code 206 may together be referred to as node behavior characterization code 207. For example, in one embodiment the design-time behavior code 208 may include graphical code, and the generation code 206 may include graphical code, and both the design-time behavior graphical code and the execution-time generation graphical code may be included in a common node behavior characterization block diagram. In another embodiment, the design-time behavior code 208 and the generation code 206 may each include text-based code that is packaged together, such as in a common software component.

Figure 6:
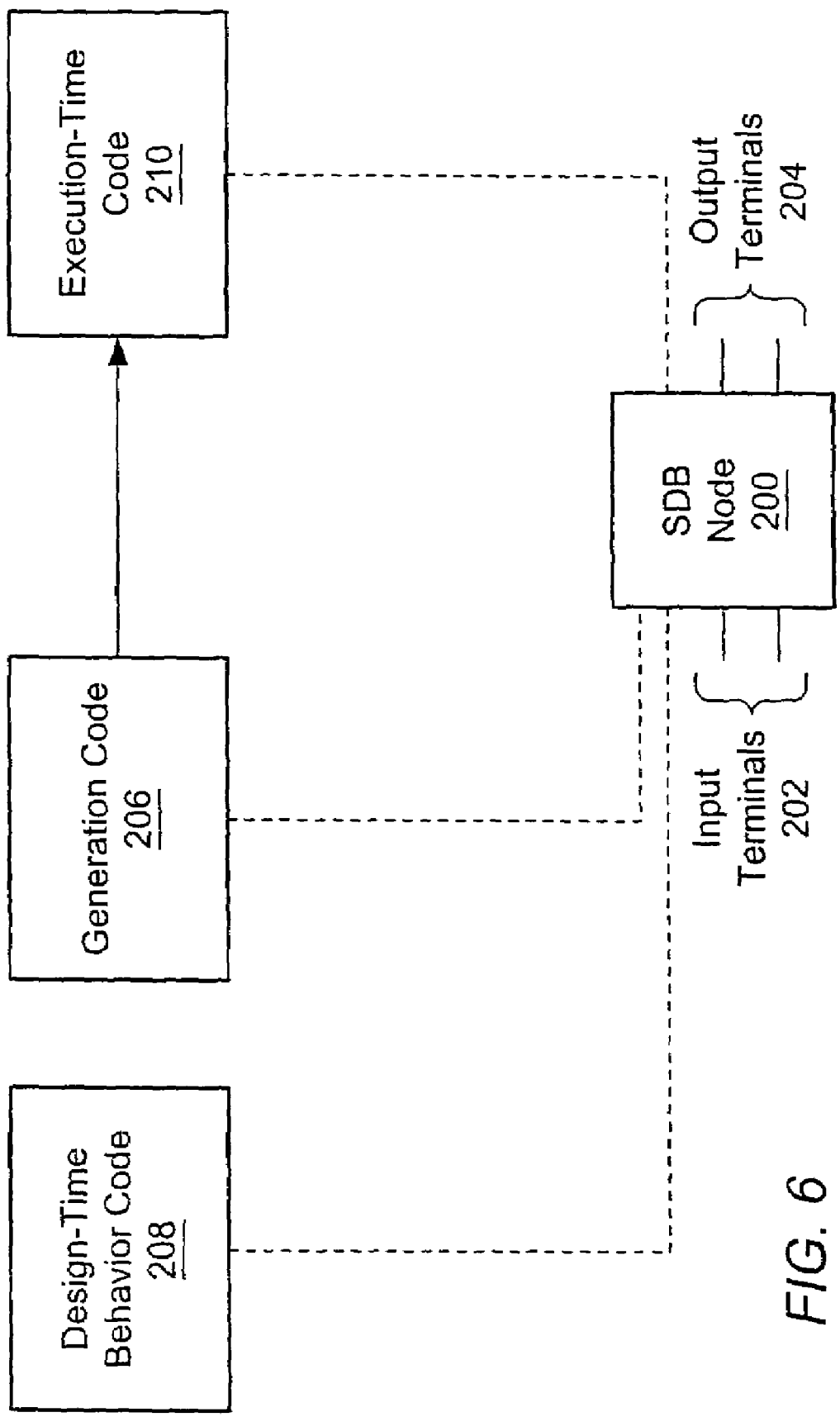

In another embodiment, the design-time behavior code 208 may be largely separate from the generation code 206, as shown in FIG. 6. For example, the design-time behavior code 208 and the generation code 206 may each include graphical code, but the respective graphical code may be located in separate block diagrams. As another example, separate software components may implement the design-time behavior code 208 and the generation code 206, or the respective code may be modularly separate.

It is noted that in other embodiments, the SDB node 200 may have associated generation code 206 but may not have associated design-time behavior code 208, or vice versa.

Figure 7:
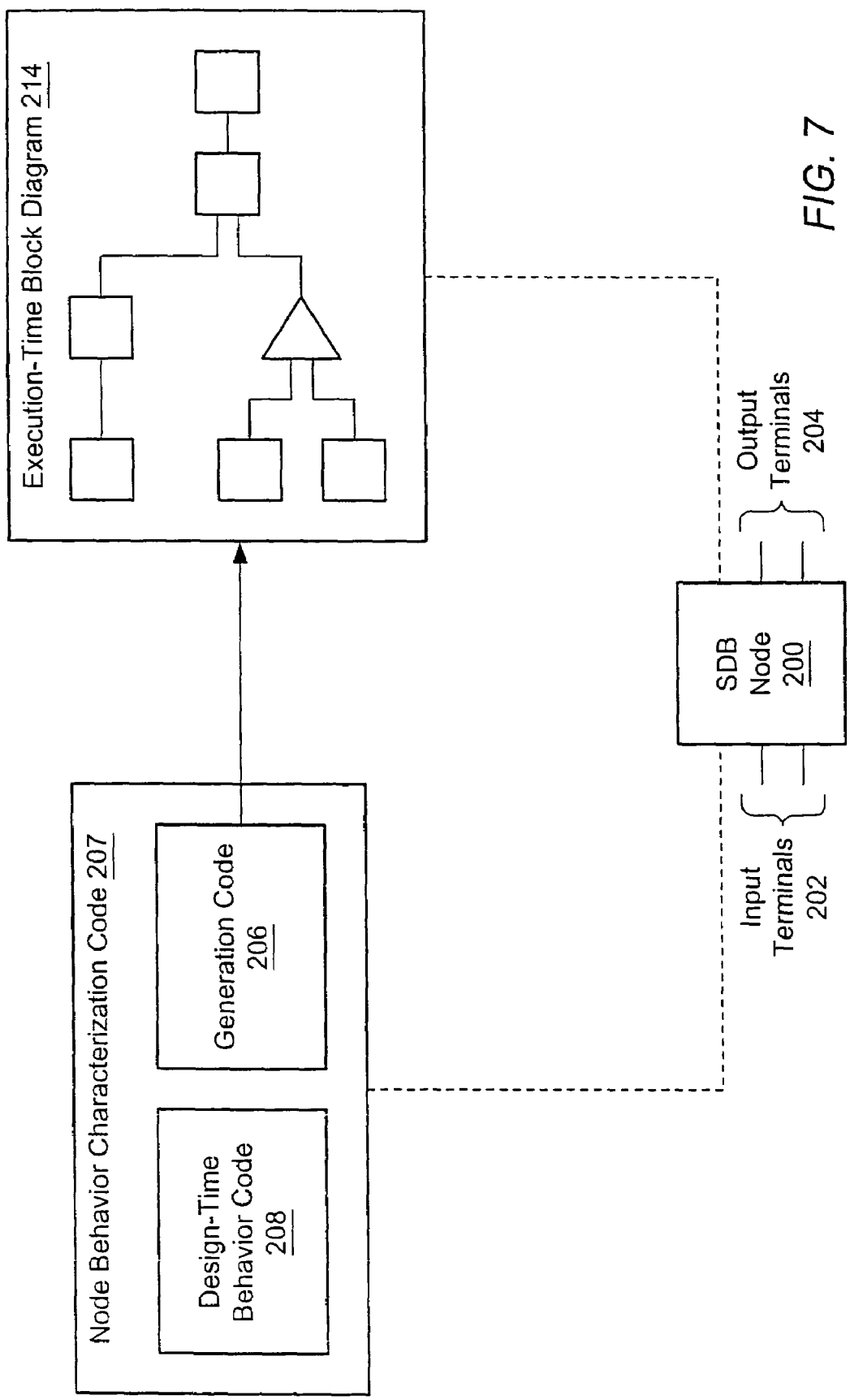

FIG. 7 illustrates an embodiment in which the execution-time code 210 includes graphical code located in an execution-time block diagram 214, similarly as described above. The illustration of the execution-time block diagram 214 shows an arbitrary example of a plurality of interconnected nodes representing the execution-time code 210.

Figure 8:
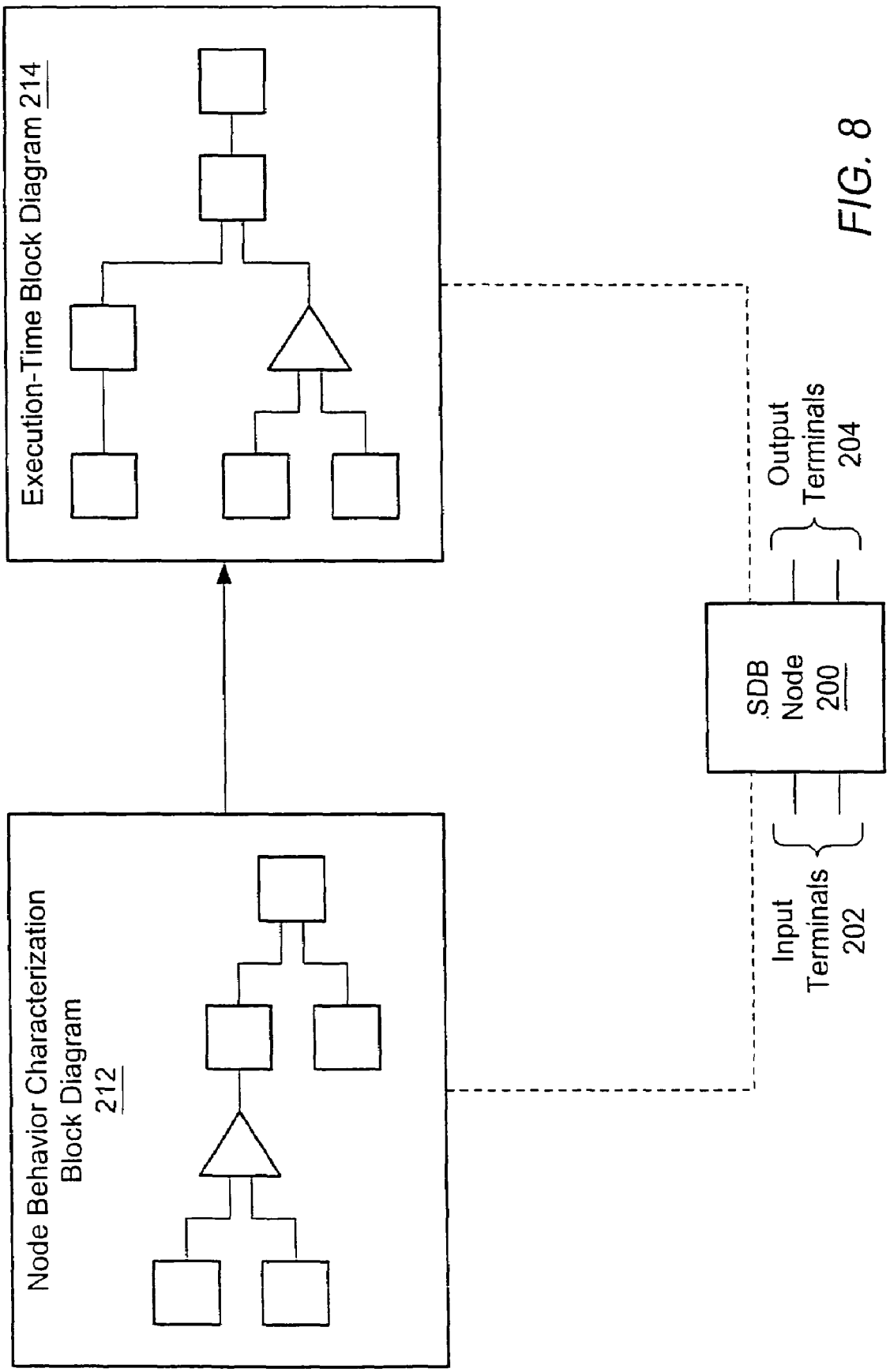

FIG. 8 illustrates an embodiment in which both an execution-time block diagram 214 and a node behavior characterization block diagram 212 are associated with the SDB node 200, similarly as described above. The illustration of the node behavior characterization block diagram 212 shows an arbitrary example of a plurality of interconnected nodes representing the generation code 206 and/or the design-time behavior code 208.

Figure 9:
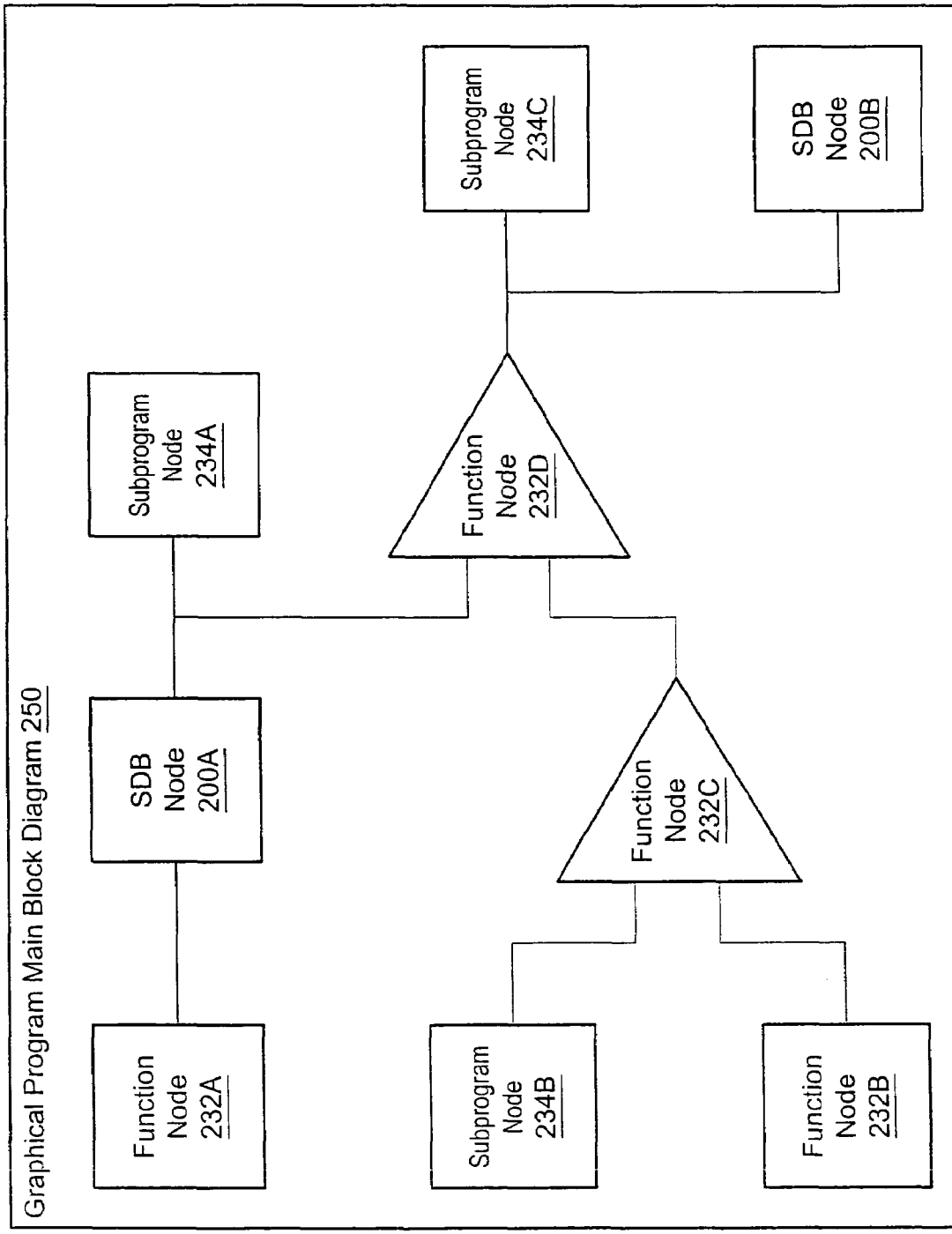
FIG. 9 illustrates an example of a graphical program that includes two self-determining behavior (SDB) nodes.

FIG. 9—SDB Node Included in a Graphical Program

FIG. 9 illustrates an example of a graphical program that includes two self-determining behavior (SDB) nodes 200. For example, the SDB nodes 200 may be included in a main or top-level block diagram of the graphical program. As shown, the graphical program may include various types of nodes such as function nodes 232, subprogram nodes 234, and the SDB nodes 200. In the example of FIG. 9, the particular arrangement of nodes and the interconnections among them is arbitrary and for illustrative purposes. An actual block diagram may be more complex and may include any of various other types of nodes or other elements, such as programmatic structures, e.g., loops, case structures, sequence structures, user interface terminals, etc. Also, the nodes in FIG. 9 are blank and simply labeled with the type of node, but the nodes in an actual block diagram may have an iconic appearance, e.g., to visually indicate the functionality provided by each node.

In various embodiments, any number of SDB nodes 200 may be present in the graphical program. FIG. 9 illustrates two SDB nodes, 200A and 200B. In one embodiment, both nodes of these nodes may be instances of a particular SDB node. In other words, the user may have included the particular SDB node twice in the graphical program. In this case, the SDB node 200A and the SDB node 200B may have associated generation code 206 which is identical. However, since the generation code 206 may be operable to generate execution-time code 210 for the respective nodes differently depending on various factors, the execution-time code 210 associated with each of the two nodes may be different. As one simple example, the generation code 206 may be operable to generate different execution-time code 210 depending on the data type of an input connected to the respective SDB node. SDB node 200A receives an input from function node 232A, and SDB node 200B receives an input from function node 232D. If the outputs of function nodes 232A and 232D have different data types, then different execution-time code 210 may be generated for the respective SDB nodes 200A and 200B.

In another embodiment, the SDB nodes 200A and 200B may not be instances of the same SDB node 200. Any of various kinds of SDB nodes may be made available for inclusion in a graphical program. Thus, the generation code 206 associated with the SDB nodes 200A and 200B may be different. For example, the intended purpose of or type of functionality provided by each of the two SDB nodes may be substantially different.

In addition to the SDB nodes 200, FIG. 9 illustrates function nodes 232 and subprogram nodes 234. The function nodes 232 may be primitive nodes provided by the graphical programming development environment. The function nodes 232 may have associated execution-time code, but may not have associated block diagrams, i.e., the execution-time functionality of the function nodes 232 may be implemented using techniques other than graphical programming techniques.

The subprogram nodes 234, on the other hand, may have associated block diagrams. For example, the graphical programming development environment may enables users to create a custom subprogram node and create a block diagram to specify execution-time functionality of the subprogram node. Also, various subprogram nodes may be provided by the graphical programming development environment itself for inclusion in graphical programs, e.g., these subprogram nodes may come with the graphical programming development environment when it is installed. Thus, there may be a hierarchy of block diagrams in a graphical program, e.g., a main or top-level block diagram, as well as block diagrams of subprogram nodes, which may in turn include other subprogram nodes having block diagrams, etc.

In one embodiment, an SDB node 200 may be included in the block diagram of a subprogram node. For example, instead of illustrating the main or top-level block diagram of a graphical program, FIG. 9 may illustrate the block diagram of a subprogram node.

Figure 10:
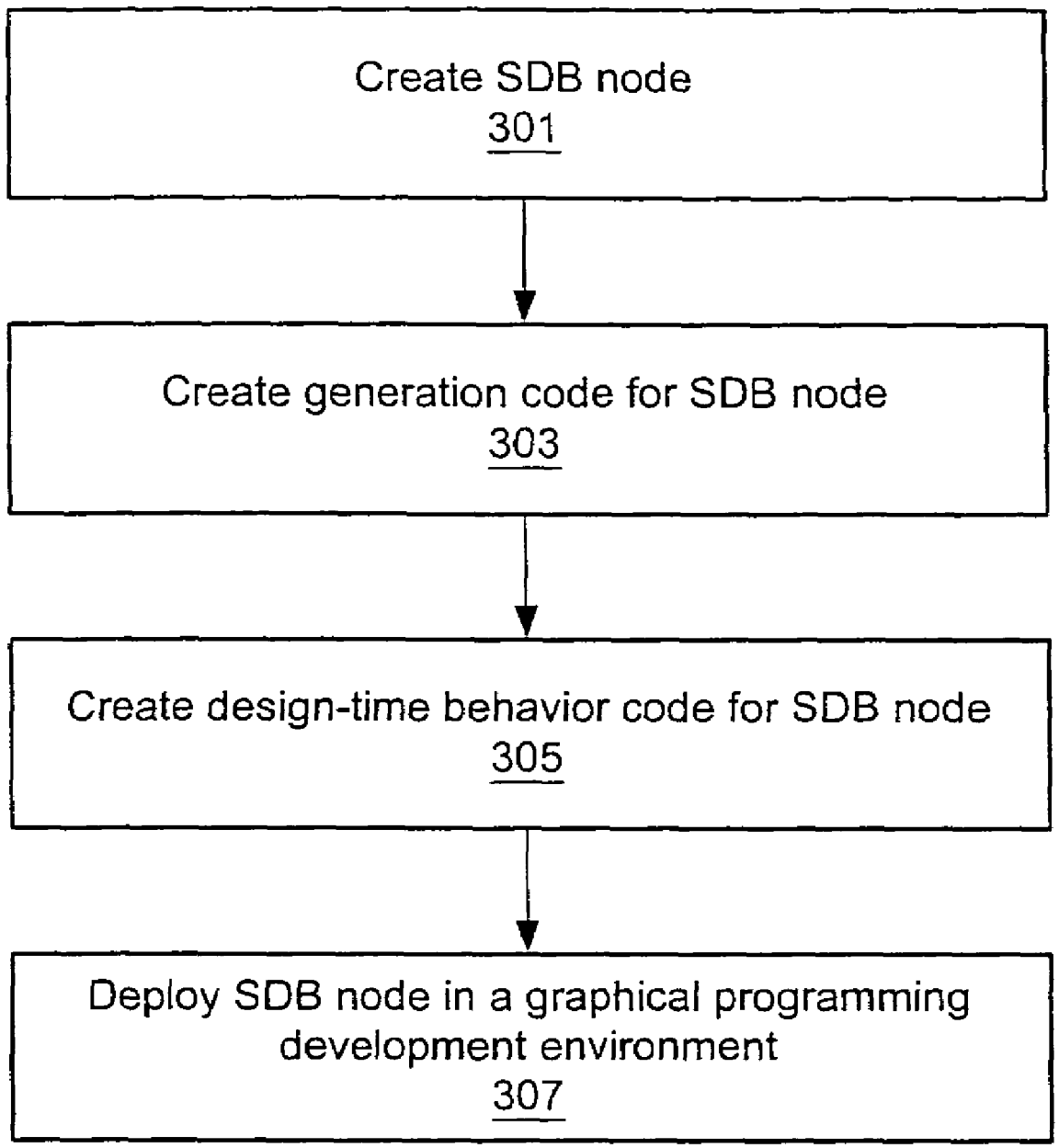
FIG. 10 is a flowchart diagram illustrating one embodiment of a method for creating a self-determining behavior (SDB) node.

FIG. 10—Creating an SDB Node

FIG. 10 is a flowchart diagram illustrating one embodiment of a method for creating a self-determining behavior (SDB) node. It is noted that FIG. 10 illustrates a representative embodiment, and alternative embodiments are contemplated. Also, various steps may be combined, omitted, or performed in different orders, etc.

In 301, the SDB node may be initially created. For example, the user may request a graphical programming development environment to create an initial or default SDB node, e.g., by utilizing a menu command or providing other input to the graphical programming development environment. In response, the graphical programming development environment may create or store initial or default data structures representing the SDB node. The data structures may include a default icon for display when the SDB node is included in a graphical program. The user may later specify another iconic appearance that better indicates the functionality of the SDB node.

In 303, generation code associated with the SDB node may be created, e.g., in response to user input. The user may specify generation code operable to programmatically generate desired execution-time code for the SDB node. As described below, the generation code may be operable to generate the execution-time code in response to or based on various types of input, events, or conditions. Also, the generation code may be operable to determine various types of code generation dependency information that affects the generation of the execution-time code.

As described above, the generation code may include code of any kind, including graphical code, text-based code, or other types of code, and the code may be associated with the SDB node in any of various ways. In one embodiment, a graphical user interface for specifying the generation code may be displayed, and the user may interact with this graphical user interface to specify the generation code. For example, in one embodiment, the generation code may include graphical code located in a block diagram. Thus, for example, a graphical user interface, e.g., a panel or window, for creating the block diagram may be displayed. The user may interact with the graphical user interface to specify the inclusion of various nodes or other elements in the block diagram, specify interconnections among the nodes, configure properties or parameters of the nodes, etc.

In another embodiment, the generation code may include text-based code. Thus, 303 may include creating or filling in one or more functions, methods, or other procedures with text-based code operable to programmatically generate execution-time code for the SDB node when executed.

In 305, design-time behavior code associated with the SDB node may be created, e.g., in response to user input. The user may specify design-time behavior code operable to affect various aspects of design-time behavior of the SDB node. Various examples of design-time behavior are discussed below. The design-time behavior code may be operable to affect design-time behavior of the SDB node in response to or based on various types of input, events, or conditions. In one embodiment, the design-time behavior code may execute in response to user input received, such as user input to edit a graphical program in which the SDB node has been included.

Similarly as described above, the design-time behavior code may include code of any kind, including graphical code, text-based code, or other types of code, and the code may be associated with the SDB node in any of various ways. For example, in one embodiment, the design-time behavior code may include graphical code located in a block diagram. Thus, graphical design-time behavior code may be included in the block diagram. In another embodiment, the design-time behavior code may include text-based code.

As described above, in one embodiment, the design-time behavior code may be packaged together with the generation code. For example, the design-time behavior code and the generation code may each include graphical code located within a common node behavior characterization block diagram. Thus, 303 and 305 may be combined. Also, in one embodiment, the SDB node may not have associated generation code or may not have associated design-time behavior code, and thus 303 or 305 may not be performed. Also, in one embodiment, the generation code and/or the design-time behavior code may be pre-existing before the SDB node is created or may be created using an application other than an application used to create the SDB node. Thus, 303 and/or 305 may comprise supplying a reference to such code.

The initial or default data structures representing the SDB node may be updated to include or reference the created generation code and design-time behavior code. Data structures and/or program instructions representing the SDB node may be stored, e.g., may be persistently stored on a memory medium. Storing the SDB node may include storing the generation code and design-time behavior code with the SDB node. In one embodiment, the generation code and/or the design-time behavior code may be converted to another format, which may also be stored.

In one embodiment, creating the SDB node may also comprise specifying an interface for connecting the SDB node to other nodes in a block diagram, e.g., by specifying one or more input and/or output terminals for the SDB node. During execution of the graphical program, the execution-time code of the SDB node may utilize inputs connected to the input terminals.

As indicated at 307, in one embodiment the created SDB node may be deployed in a graphical programming development environment. Deploying the SDB node in the graphical programming development environment may include enabling the graphical programming development environment to allow users to include the SDB node in graphical programs created using the graphical programming development environment. For example, the SDB node may be created using an application, e.g., a graphical programming development environment application, installed on a first computer system. One or more files representing the SDB node may then be stored on a second computer system (or a memory medium accessible from the second computer system), such that when a graphical programming development environment installed on the second computer system is executed to create or edit a graphical program, the graphical programming development environment allows a user to include the SDB node in the graphical program. For example, the SDB node may appear or be listed in a palette or library of nodes available for inclusion, or the user may be able to select one or more files representing the SDB node to request the SDB node to be included.

Thus, for example, an SDB node may be created by a first user and then deployed in a graphical programming development environment on a second user's computer system. The second user may then create a graphical program that uses the SDB node created by the first user. For example, the first "user" may be the vendor of the second user's graphical programming development environment. Thus, the SDB node may be installed along with the graphical programming development environment on the second user's computer system, or may be deployed in the graphical programming development environment at a later date. Also, the first user may be a third-party developer who creates a library of graphical program nodes to provide additional functionality.

In another embodiment, the same user who creates an SDB node may also create a graphical program that uses the SDB node. Thus, it may not be necessary to perform 307 since the SDB node may already be accessible from the user's graphical programming development environment.

Figure 11:
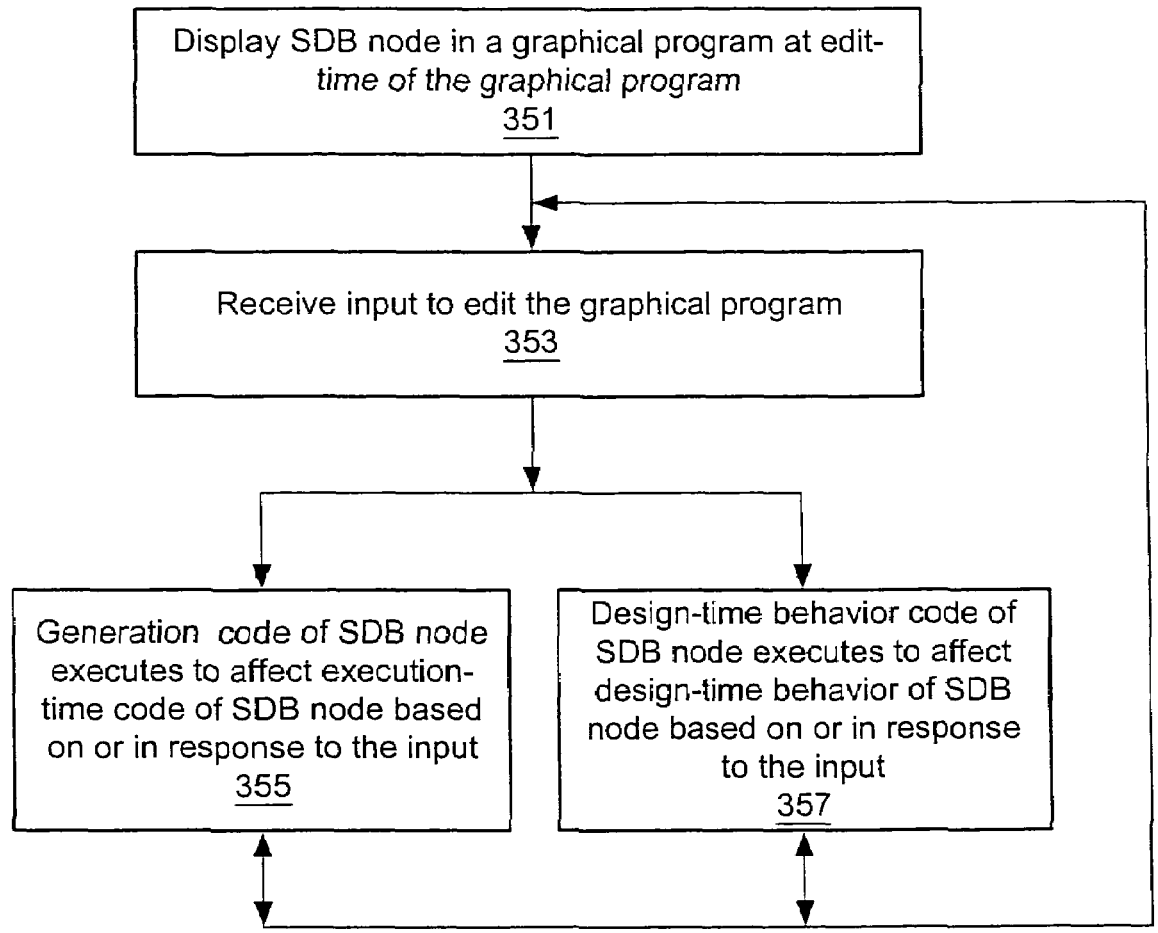
FIG. 11 is a flowchart diagram illustrating one embodiment of a method for creating a graphical program that utilizes a self-determining behavior (SDB) node.

FIG. 11—Creating a Graphical Program that Utilizes an SDB Node

FIG. 11 is a flowchart diagram illustrating one embodiment of a method for creating a graphical program that utilizes a self-determining behavior (SDB) node. It is noted that FIG. 11 illustrates a representative embodiment, and alternative embodiments are contemplated. Also, various steps may be combined, omitted, or performed in different orders.

In 351, an SDB node may be displayed in a graphical program at edit-time of the graphical program, i.e., as the graphical program is being created or edited. For example, the SDB node may be displayed in a block diagram of the graphical program in response to a user requesting to include the SDB node in the block diagram. As described above with reference to FIG. 9, the SDB node may be one of a plurality of nodes in the block diagram. The graphical program or block diagram may be created or assembled by the user arranging on the display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons that visually indicate the functionality of the program. As described above, a user interface or front panel for the graphical program may also be created, e.g., in response to user input.

In 353, input to edit the graphical program may be received. Based on the input received and/or in response to the input received, the generation code of the SDB node may execute in 355 to programmatically generate or affect execution-time code of the SDB node, and/or design-time behavior code of the SDB node may execute in 357 to affect design-time behavior of the SDB node.

The generation of the execution-time code of the SDB node may be performed based on or in response to any of various kinds of input received in 353. In one embodiment, the input may comprise input to a block diagram of the graphical program. For example, the input may be received in the process of creating the plurality of interconnected nodes as described above.

As one example, the input received in 353 may include input specifying the connection of one or more inputs to input terminals of the SDB node. For example, the generation code of the SDB node may be operable to programmatically generate execution-time code based on data types of the inputs. For example, the generation code may enable the SDB node to exhibit polymorphic behavior, as discussed in more detail below. Also, the execution-time code may be programmatically generated based on one or more values of the connected inputs. For example, if a constant integer input value within a first range is connected to the SDB node, first execution-time code may be generated, wherein the first execution-time code has first functionality, and if a constant integer input value within a second range is connected to the SDB node, second execution-time code may be generated, wherein the second execution-time code has second functionality.

As another example, the execution-time code may be generated based on which particular subset of inputs are connected to the SDB node. The SDB node may have a plurality of input terminals, but the user may not be required to connect inputs to all of the terminals. As a simple example, consider an SDB node having a first input terminal, wherein an input connected to the first input terminal may affect execution behavior of the SDB node, or there may be no effect on the execution behavior of the SDB node if no input is connected to the first input terminal. Thus, if no input is connected to the first input terminal, then the generation code may programmatically generate execution-time code for the SDB node that does not include logic for checking the value of an input connected to the first input terminal and responding to the input value. This may result in the execution-time code being smaller and more efficient.

In a case in which the execution-time code is generated based on which particular subset of inputs are connected to the SDB node, it may be difficult to know at edit-time which inputs will eventually be connected to the SDB node. In one embodiment, the generation code may execute each time the subset of connected inputs changes and may interactively re-generate or modify the execution-time code each time based on the connected inputs. In another embodiment, it may be desirable to generate the execution-time code a single time, e.g., after the user has finished editing the graphical program. For example, the generation code associated with the SDB node may be executed to generate the execution-time code when the graphical program is compiled or just prior to execution of the graphical program. Thus, in various embodiments, the generation code may execute to generate execution-time code for the SDB node based on input received to edit the graphical program, but may not execute immediately in response to the input.

As another example, the execution-time code may be generated based on which other nodes the user includes in the graphical program or based on the configuration of other nodes in the graphical program. As a simple example, consider an SDB node designed to analyze data acquired from an acquisition node, wherein the acquisition node is configurable to acquire data from different types of sources. It may be desirable to analyze the data differently, depending on the source type from which the data is acquired. For example, if the user configures the acquisition node to acquire data from a first source type, the generation code of the SDB node may execute to generate first execution-time code having first functionality, and if the user configures the acquisition node to acquire data from a second source type, the generation code of the SDB node may execute to generate second execution-time code having second functionality, wherein the first functionality is different than the second functionality.

In various embodiments, the execution-time code for the SDB node may be generated or modified based on or in response to user input received to configure the SDB node in the graphical program. The SDB node may be able to take on different functionality in the graphical program, depending on configuration user input received. For example, the node may be generally related to a particular functional realm, such as data acquisition, signal analysis, data display, network communications, etc. However, until configuration user input is received for the node, the exact execution-time behavior of the node within the graphical program may be undefined.

In one embodiment, the SDB node may have a configuration user interface for configuring the SDB node, e.g., for specifying desired execution-time functionality of the SDB node. For example, the configuration user interface may include one or more graphical panels or windows. The configuration user interface may comprise information useable in guiding the user to specify desired functionality for the SDB node. The SDB node may be configured to perform a variety of functions within the graphical program, depending on user input received to the configuration user interface. As noted above, the node may be generally related to a particular functional realm, such as data acquisition, signal analysis, data display, etc. Thus, the configuration user interface may display information related to the particular functional realm. For example, for an SDB node related to network communications, the configuration user interface may include GUI controls for specifying a data source or target to which to connect when the SDB node is executed, specify a connection protocol to use, etc.

Thus, in one embodiment, creating the SDB node as described above may also include creating a configuration user interface for the SDB node. After the SDB node has been included in the graphical program, the user may invoke the configuration user interface to configure the SDB node, e.g., by double-clicking on the SDB node, selecting a menu option to request to configure the SDB node, or in any of various other ways.

Thus, in one embodiment an SDB node may be configured to perform a plurality of operations, depending on user input specifying configuration information for the SDB node. The configuration user interface may enable the user to specify one or more desired operations for the SDB node from the plurality of possible operations. However, since the execution-time code associated with the SDB node may be generated programmatically, a "minimal" amount of execution-time code may be generated, i.e., only code necessary to implement the one or more specified operations may be generated. Thus, code corresponding to operations from the plurality of operations that are not among the one or more specified operations may not be included in the graphical program. Associating a minimal amount of execution-time code with a node in a graphical program node in this way may be advantageous in some situations, e.g., by reducing the size of the graphical program.

In various other embodiments, the execution-time code for the SDB node may be generated based on any of various other kinds of input to edit the graphical program. For example, in one embodiment, the generation code may be operable to generate the execution-time code in response to displaying the SDB node in the graphical program in 351. In another embodiment, receiving input to edit the graphical program in 353 may include receiving input to edit a user interface or front panel of the graphical program, and the execution-time code may be programmatically generated based on this input.

Referring again to FIG. 11, 357 illustrates that in one embodiment, design-time behavior code of the SDB node may execute to affect design-time behavior of the SDB node based on or in response to the input received to edit the graphical program. In various embodiments, the design-time behavior code may affect any of various aspects of the design-time behavior of the SDB node. For example, the design-time behavior code may affect a user's experience of interacting with or viewing the SDB node when editing the graphical program. In one embodiment, the design-time behavior code may execute in response to user input received to a block diagram of the graphical program. For example, the user input may be received in the process of creating the plurality of interconnected nodes as described above.

In some embodiments, the user input may be received to the SDB node itself. For example, user input to the SDB node may include: selecting the SDB node; clicking on the SDB node (e.g., left-clicking, right-clicking, or double-clicking); re-sizing the SDB node; moving the SDB node to another location within the block diagram; moving a mouse cursor over the SDB node; etc.

As one example, the design-time behavior code of the SDB node may be operable to display a custom context menu or popup menu for the SDB node, e.g., in response to the user right-clicking on the SDB node. For example, the context menu may include items operable to invoke a user interface to configure the SDB node or checkable Boolean items indicating desired properties of the SDB node. For example, these properties may affect the generation of the execution-time code for the SDB node. The menu items may also allow the user to specify desired edit-time behavior of the SDB node, e.g., whether to dynamically change the input/output terminals of the SDB node as described below.

As another example, the design-time behavior code may be operable to change the number of input/output terminals of the SDB node and/or may affect the terminal names. For example, after the user has configured the SDB node using a configuration user interface such as described above, some of the possible input/output terminals may not be applicable. Thus, the design-time behavior code may execute to dynamically display only relevant terminals. For example, before the user configures the SDB node, a first output terminal may be displayed. If the first output terminal is no longer relevant after the user configures the SDB node, the design-time behavior code may cause this terminal to be hidden. Similarly, if a first input terminal is hidden before the user configures the SDB node, the design-time behavior code may cause the first input terminal to be displayed after the user configures the SDB node if the new configuration requires input to this terminal or makes the terminal relevant.

The terminals of the SDB node may also be affected depending on any of various other kinds of input. For example, if the user connects an input of a first data type to a first input terminal that makes a second input terminal irrelevant, then the second input terminal may be hidden. As another example, if the user connects an input of a first data type to a first input terminal, then a displayed name for the first input terminal or for another terminal may be changed, e.g., to more precisely indicate the purpose of the terminal.

As another example, the design-time behavior code may be operable to change the iconic appearance of the SDB node within the graphical program. For example, the SDB node may have a default icon, and the design-time behavior code may dynamically change the icon depending on how the SDB node has been configured within the graphical program, e.g., depending on input received to a configuration user interface, depending on inputs connected to the SDB node, depending on which nodes the SDB node provides outputs to, etc. As an example, consider a polymorphic SDB node operable to perform a polymorphic operation on two inputs. The icon for the SDB node may be dynamically changed depending on the data types of inputs the user connects to the SDB node, e.g., to more descriptively represent the operation of the SDB node. The new icon may take on any of various shapes or sizes. For example, most nodes in the graphical program may be displayed using an icon of a fixed size, e.g., 32×32 pixels. However, the SDB node may be represented using a larger or smaller icon, as appropriate. Also, an SDB node may be displayed using an icon of any arbitrary shape in addition to square or rectangular icons. For example, the shape and appearance of the icon may change depending on user input.

As another example, the design-time behavior code may be operable to affect the SDB node's behavior in response to the user moving a mouse cursor over the SDB node. For example, the design-time behavior code may display an informative message which may vary depending on the current configuration of the node. As another example, if some of the SDB node's input/output terminals have been hidden as described above, then the design-time behavior code may cause all of the terminals to be temporarily displayed while the mouse cursor is located over the SDB node.

In various embodiments, a user interface or dialog may be displayed for various other purposes besides configuring functionality of the SDB node and may be displayed in response to any of various causes or conditions. As one example, if the user connects an input having an invalid data type to an input terminal of the SDB node, the design-time behavior code may be operable to display a dialog informing the user of the error and informing the user how to correctly use the SDB node.

In one embodiment, both the generation code and the design-time behavior code may execute in response to a given input to edit the graphical program. As one example, in response to receiving input via a configuration user interface to configure the SDB node, the generation code may execute to generate execution-time code based on the specified configuration, and the design-time behavior code may execute to cause a descriptive icon to be displayed based on the specified configuration. In other embodiments, the generation code may execute in response to a given input, but the design-time behavior code may not execute, or vice versa.

Referring again to FIG. 11, the arrows returning from 355 and 357 to 353 indicate that 353, 355, and 357 may be performed repeatedly.

It is noted that FIG. 11 represents one embodiment of a method for creating a graphical program that utilizes an SDB node, and variations of the method are contemplated. For example, in various embodiments, the generation code may be operable to programmatically generate execution-time code for the SDB node based on or in response to any of various other events, conditions, or information besides input received to edit the graphical program. Similarly, the design-time behavior code may also be operable to affect design-time behavior of the SDB node based on or in response to factors other than input received to edit the graphical program.

For example, in one embodiment the method may comprise determining code generation dependency information, wherein the generation code is operable to generate or modify the execution-time code for the SDB node based on or depending on the code generation dependency information. In various embodiments, the code generation dependency information may include information of any kind and from any source. For example, the code generation dependency information may be associated with one or more of: a state of the graphical program; a state of the SDB node or another node in the graphical program; a state of a graphical programming development environment application used to create the graphical program; etc.

As one example, the graphical programming development environment may allow the user to set options regarding a computing platform on which the graphical program is intended to execute. Thus, execution-time code for the SDB node may be generated differently depending on the target platform. For example, if the graphical program will execute on an FPGA device, the execution-time code may be generated in such a way as to facilitate the graphical program to execute efficiently when deployed on the FPGA device.

In other embodiments, the code generation dependency information may include information determined from a source external to the graphical program and external to a graphical programming development environment application used to create the graphical program. For example, the code generation dependency information may be received from a second application external to the graphical programming development environment application, such as another programming environment application or another type of application. As another example, the code generation dependency information may be received from a computer server via a network. For example, the computer server may provide information to allow the execution-time code of the SDB node to be updated periodically, e.g., to extend the functionality of the SDB node or to provide bug fixes.

As another example of code generation dependency information, the generation code may be operable to programmatically generate or modify execution-time code for the SDB node based on the user's history of using the SDB node. For example, when the SDB node was previously used in a first graphical program, the user may have utilized a configuration user interface to configure the SDB node as described above, and execution-time code may have been dynamically generated based on the user's input. The configuration information specified by the user may be stored such that when the user later includes the SDB node in a second graphical program, the SDB node is automatically configured as in the first graphical program, and execution-time code for the SDB node in the second graphical program may be programmatically generated identically as in the first graphical program. Also, separate history information may be maintained for different users, e.g., so that the SDB node may behave differently when different users are creating graphical programs.

Also, in one embodiment the generation of the execution-time code may depend on input received from other sources besides a user. For example, the above-incorporated patent application titled, "System and Method for Programmatically Generating a Graphical Program in Response to Program Information" discloses a method in which a client application may programmatically specify the creation of a graphical program. Thus, for example, a server application may programmatically create the graphical program based on input received from the client application. Where the client application specifies the inclusion of an SDB node in the graphical program, the execution-time code for the SDB node may be dynamically generated based on other information specified by the client application, such as other nodes specified for inclusion in the graphical program, data types of inputs specified for connection to the SDB node's input terminals, etc.

The design-time behavior code may also execute in response to factors other than input to edit the graphical program. For example, the design-time behavior code may be operable to affect design-time behavior of the SDB node based on design-time behavior information, wherein the design-time behavior information may include information of any kind and from any source. As one example, the design-time behavior information may be received from a second application external to the graphical programming development environment application used to create the graphical program. For example, the user may use an external application to configure hardware devices coupled to the computer system. For example, if a data acquisition (DAQ) device is coupled to the computer system, the user may create various named channels referencing the device. Thus, if the SDB node is designed to perform a DAQ-related function, then the design-time behavior code associated with the SDB node may be operable to determine the channel information and affect design-time behavior of the SDB node in various ways based on the channel information. For example, if the user specifies an invalid channel as an input to the SDB node, the design-time behavior code may be operable to alert the user of this error, e.g., by affecting the appearance of the SDB node or otherwise drawing the user's attention.

In various embodiments, multiple SDB nodes may be included in a graphical program, and the SDB nodes may interact with each other in various ways. As one example, a pair of SDB nodes may perform a function together, and changing one of the SDB nodes may affect the other. For example, if the user utilizes a configuration user interface to re-configure one of the SDB nodes, then the execution-time code for both of the SDB nodes may be re-generated in response.

It is noted that the above examples of the generation code programmatically generating or modifying execution-time code for the SDB node are intended to be exemplary only, and many other possible uses of the generation code are contemplated. Similarly, the above examples of the design-time behavior code affecting behavior of the SDB node are intended to be exemplary only, and many other possible uses of the design-time behavior code are contemplated.

Figure 12:
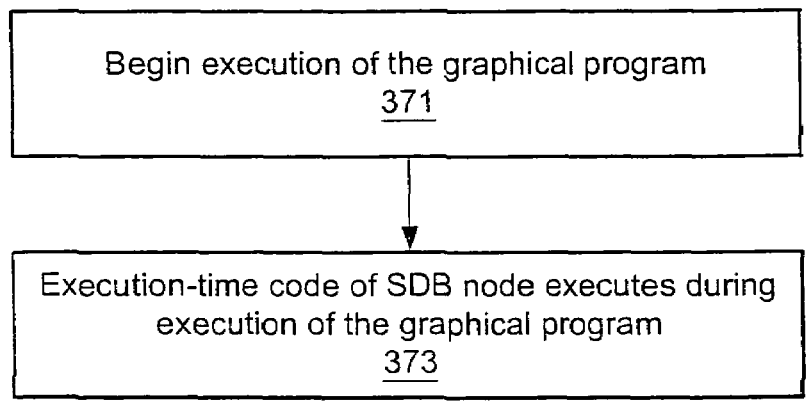
FIG. 12 is a flowchart diagram illustrating one embodiment of a method for executing a graphical program that includes a self-determining behavior (SDB) node.

FIG. 12—Executing a Graphical Program that Includes an SDB Node

FIG. 12 is a flowchart diagram illustrating one embodiment of a method for executing a graphical program that includes a self-determining behavior (SDB) node. It is noted that FIG. 12 illustrates a representative embodiment, and alternative embodiments are contemplated. Also, various steps may be combined, omitted, or performed in different orders.

In 371, the graphical program may begin execution. The graphical program may be executed on any kind of computer system(s) or (re)configurable hardware.

In 373, the execution-time code of the SDB node in the graphical program may be executed, wherein the execution-time code was programmatically generated or modified by generation code associated with the SDB node, as described above with reference to FIG. 11.

Implementation Details

In various embodiments, the SDB nodes and methods described above may be implemented in various ways, e.g., depending on the particular graphical programming development environment used. In one embodiment, an interface may be defined between the graphical programming development environment and the SDB node such that the graphical programming development environment is operable to call into the generation code and/or the design-time behavior code of the SDB node in response to various events or conditions, such as those described above. In various embodiments, the generation code or design-time behavior code may be called at any point during execution of a graphical programming development environment application.

As one example, the interface may define an "input connection" operation such that the graphical programming development environment is operable to call into a specific portion of the generation code and/or the design-time behavior code in response to an input being connected to an input terminal of the SDB node. In various embodiments, the interface may be implemented in any way and may define any kind of event, condition, or other factor that causes execution of a portion of the generation code or design-time behavior code.

The generation code and design-time behavior code may be modularized such that specific portions of the code may be executed in response to particular events or conditions. In various embodiments, the code may be modularized in any way, e.g., depending on a particular implementation, such as whether the code includes graphical code and/or text-based code, etc. For example, the portions of code may be constructed in the form of subprogram nodes, callback functions or methods, cases in a case structure, or in any other way desired.

A few examples of when portions of the generation code or design-time behavior code may be invoked include: when the user first includes an SDB node in a graphical program; when the user moves the SDB node within the graphical program; when the user re-sizes the SDB node; when the user connects an input or output to the SDB node; when the user requests to compile a graphical program that includes the SDB node; when the user clicks on the SDB node; when the user moves a mouse cursor over the SDB node; when a graphical program including the SDB node is initially opened; when the SDB node is painted or drawn on the display; etc. These are just a few examples, and the generation code or design-time behavior code may be invoked in response to any other situation as desired.

In one embodiment, in addition to an interface defining points in which the graphical programming development environment may call into the code of the SDB node, an interface may also define points in which the code of the SDB node may call into the graphical programming development environment. For example, in one embodiment the graphical programming development environment may "listen for" various actions that the generation code or design-time behavior code of the SDB node performs when the code is executed. For example, the graphical programming development environment may listen for a request to display a configuration user interface; a request to generate execution-time code; a request to display a new icon in the block diagram; a request to connect to a server to retrieve information; etc.

As one example, the graphical programming development environment may invoke the generation code of the SDB node when a graphical program including the SDB node is compiled. The generation code may then attempt to dynamically generate execution-time code for the SDB node. However, if a problem with the configuration of the SDB node is discovered during this process, the generation code may request the graphical programming development environment to interrupt the compilation process and display an informative message to the user.

FIGS. 13-16: Example of a Polymorphic SDB Node

In some prior art implementations of polymorphic subprogram nodes, the user was required to create a separate subprogram node to handle each case, i.e., each data type or combination of data types. An SDB node such as described above may eliminate the need to create a separate case for each data type or combination of data types. Instead, the generation code associated with the SDB node may be operable to programmatically generate appropriate execution-time code for whatever combination of data types the user connects to the SDB node. This may enable the subprogram node to be completely polymorphic, e.g., to handle all possible data types or combinations of data types in situations where this was not practical before because the number of polymorphic combinations was too large.

FIGS. 13-16 illustrate an exemplary implementation of a polymorphic addition SDB node, i.e., an SDB node operable to "add" inputs of various data types. For example, if the user connects two inputs having integer data types to the SDB node, the SDB node may be operable to output an integer sum. If the user connects two inputs having string data types to the SDB node, the SDB node may be operable to output a string concatenation of the two strings.

Figure 13:
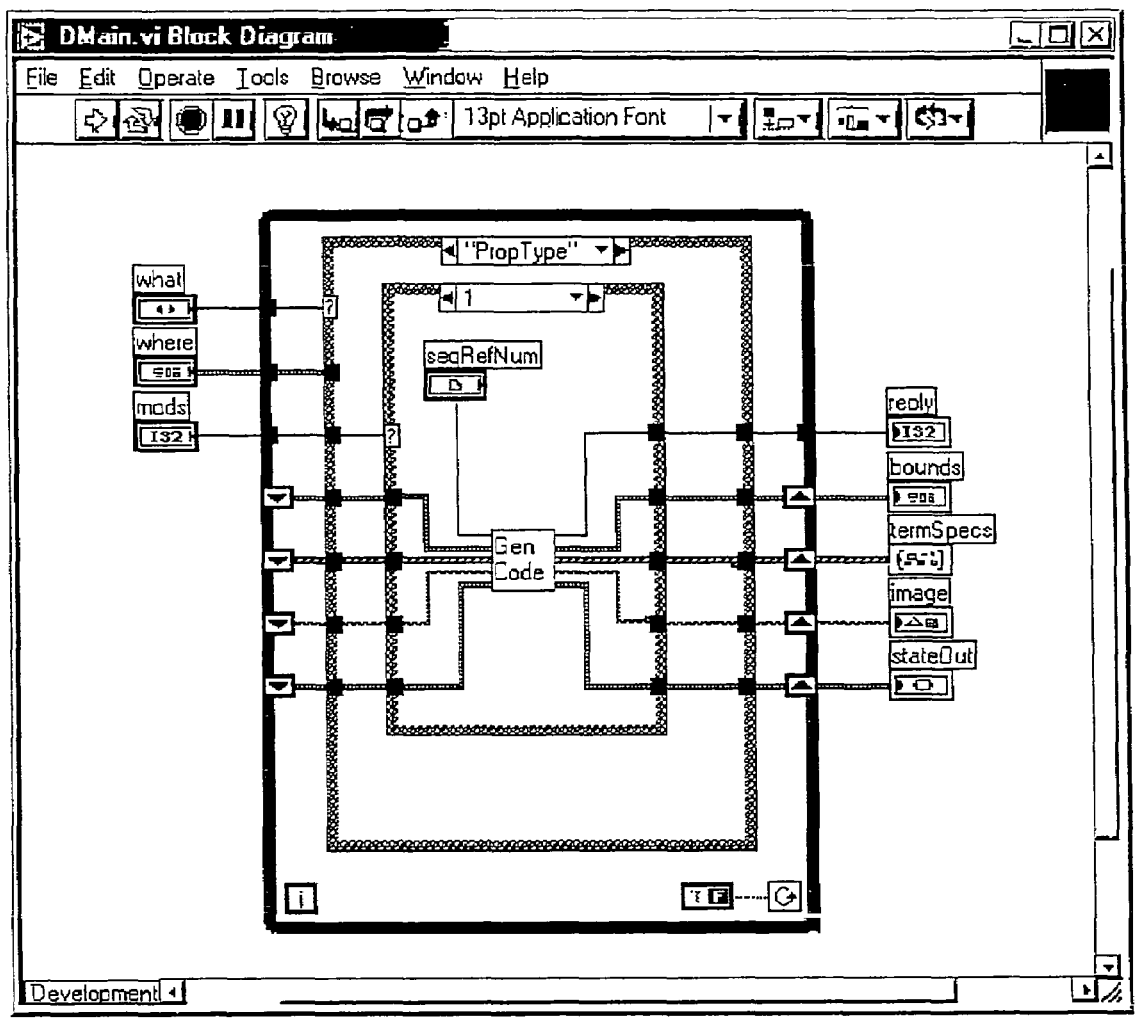
FIGS. 13-16 illustrate an exemplary implementation of a polymorphic addition SDB node.
Figure 14:
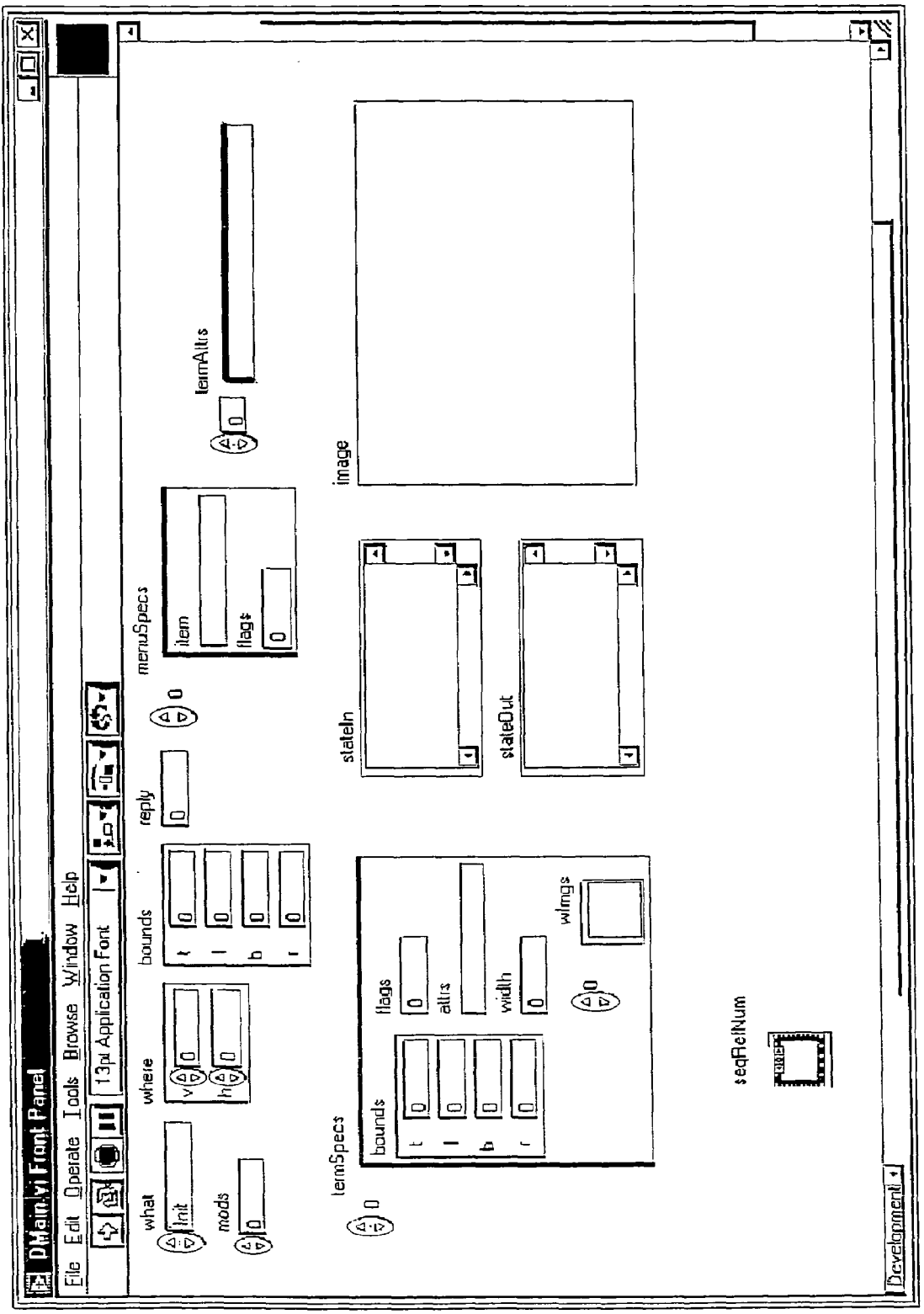

In the example of FIGS. 13-16, the generation code is implemented as a block diagram associated with the SDB node, as shown in FIG. 13. In this example, generation code and design-time behavior code are both included together in the same block diagram. FIG. 13 illustrates a block diagram including two nested case structures. The outermost case structure (labeled "PropType") includes cases that correspond to points at which the generation code/design-time behavior code may be called, i.e., the cases are defined by an interface between the graphical programming development environment and the SDB node such as described above. FIG. 14 illustrates a graphical view of this interface. For example, the input control labeled "what" includes items that match the cases in the outermost case structure shown in FIG. 13.

In FIG. 13, the "PropType" case is shown selected in the outermost case structure. The code for the "PropType" (i.e., type propagation) case may be invoked when the type information is propagated to the SDB node, such as when the user connects inputs to the SDB node. In response, the execution-time code for the SDB node may be programmatically generated, wherein the execution-time code is generated in such a way as to have appropriate functionality depending on the connected data types. For example, as described above, if the user connects two inputs with integer data types to the SDB node, the execution-time code may be generated so as to be operable to output an integer sum; if the user connects two inputs with string data types to the SDB node, the execution-time code may be generated so as to be operable to output a string concatenation; etc.

Figure 15A:
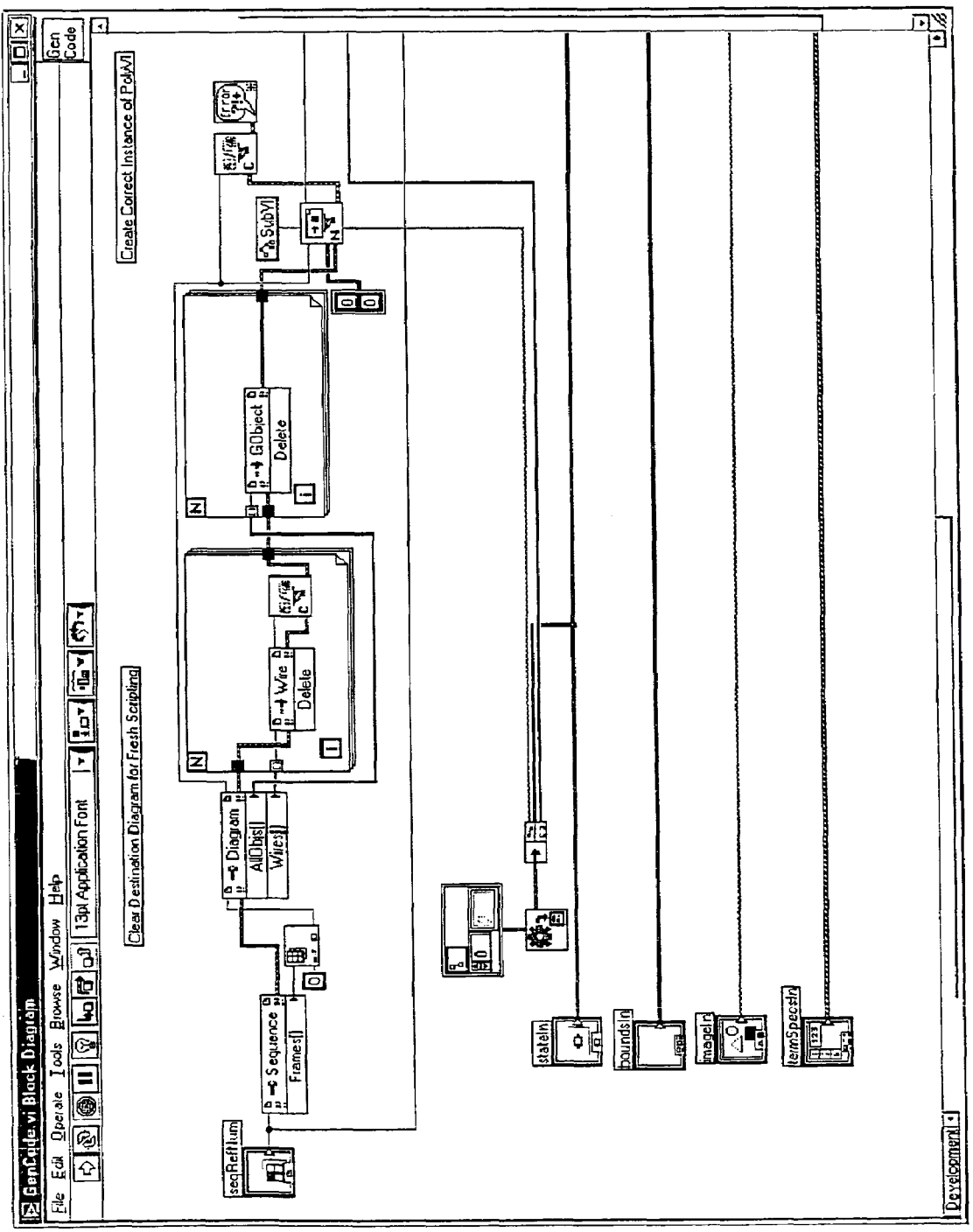
Figure 15B:
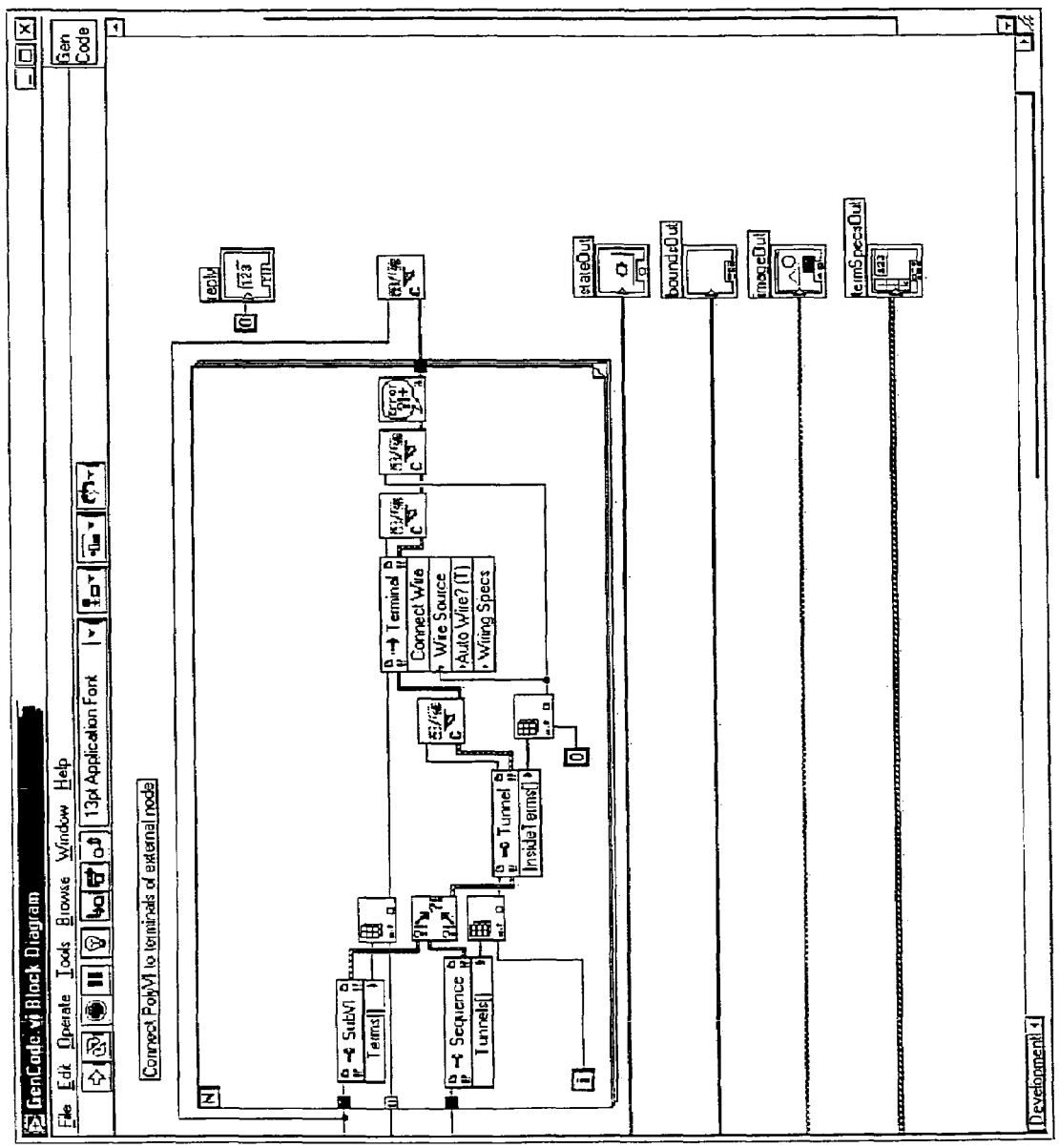

The subprogram node labeled "Gen Code" is operable to perform the actual generation of the execution-time code. FIGS. 15A and 15B illustrate graphical code associated with the "Gen Code" subprogram node.

Figure 16:
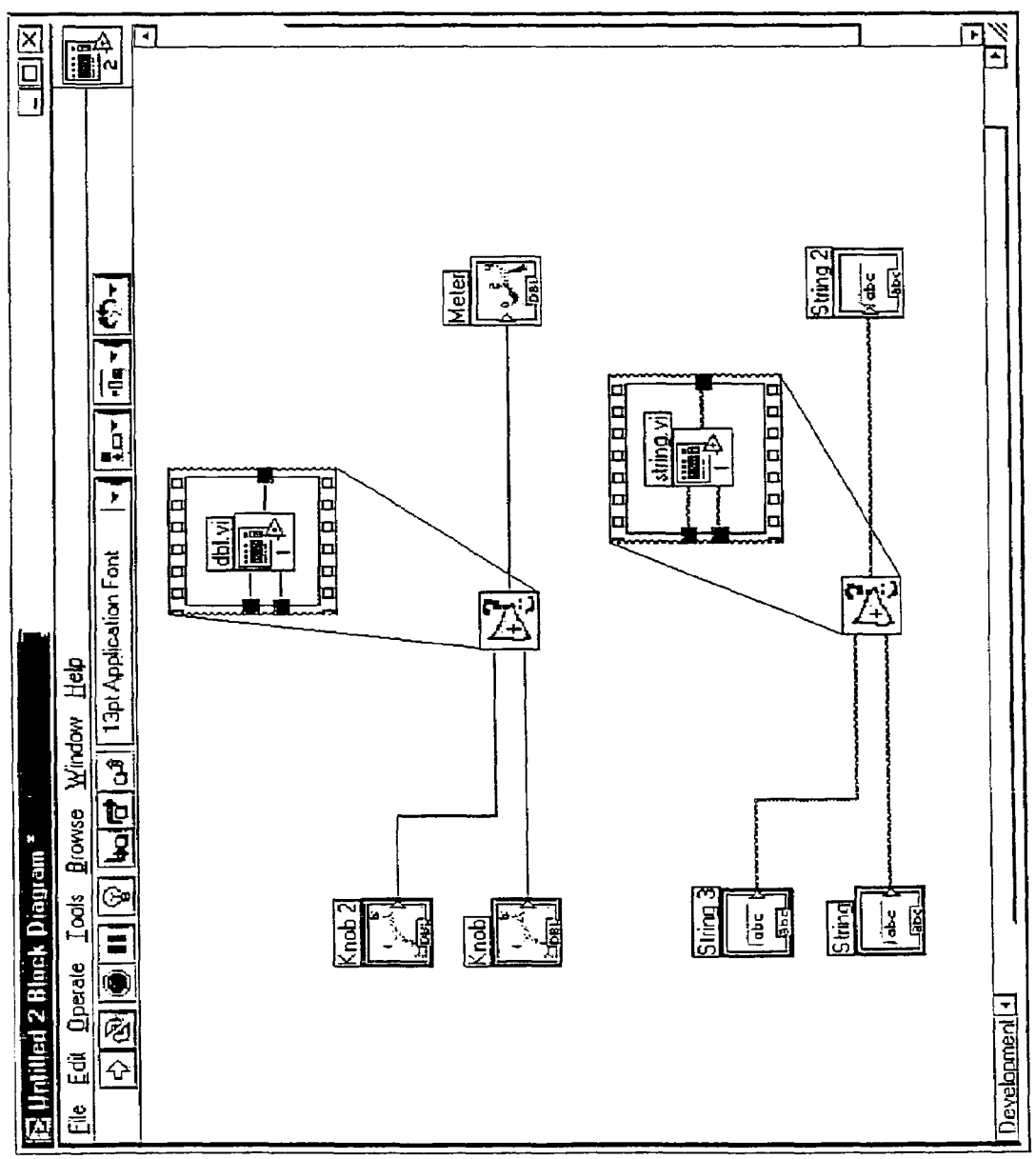

FIG. 16 illustrates an exemplary graphical program that includes two instances of the SDB node described above, e.g., illustrates a main block diagram of the graphical program, such as described above with reference to FIG. 9. Two nodes labeled "Knob" and "Knob 2" which produce outputs having a "double" data type are shown connected to a first instance of the SDB node. In this case, code operable to add the two inputs to produce an output of type "double" was programmatically generated, as represented by the node labeled "dbl.vi". (The node labeled "dbl.vi" is not actually displayed in the graphical program, but is shown in FIG. 16 for illustrative purposes to show what is conceptually "behind" the first instance of the SDB node.) Similarly, two nodes labeled "String" and "String 3" which produce outputs having a "string" data type are shown connected to a second instance of the SDB node. In this case, code operable to concatenate the two inputs to produce an output of type "string" was programmatically generated, as represented by the node labeled "string.vi". (The node labeled "string.vi" is not actually displayed in the graphical program, but is shown in FIG. 16 for illustrative purposes to show what is conceptually "behind" the second instance of the SDB node.)

It is noted that FIGS. 13-16 illustrate one particular example of an SDB node, wherein the SDB node is implemented in one particular way within the LabVIEW graphical programming development environment. However, in various embodiments, an SDB node designed for any purpose may be utilized within any graphical programming development environment and may be implemented in any way, e.g., depending on the requirements of and programming features available within the particular graphical programming development environment.

Figure 17:
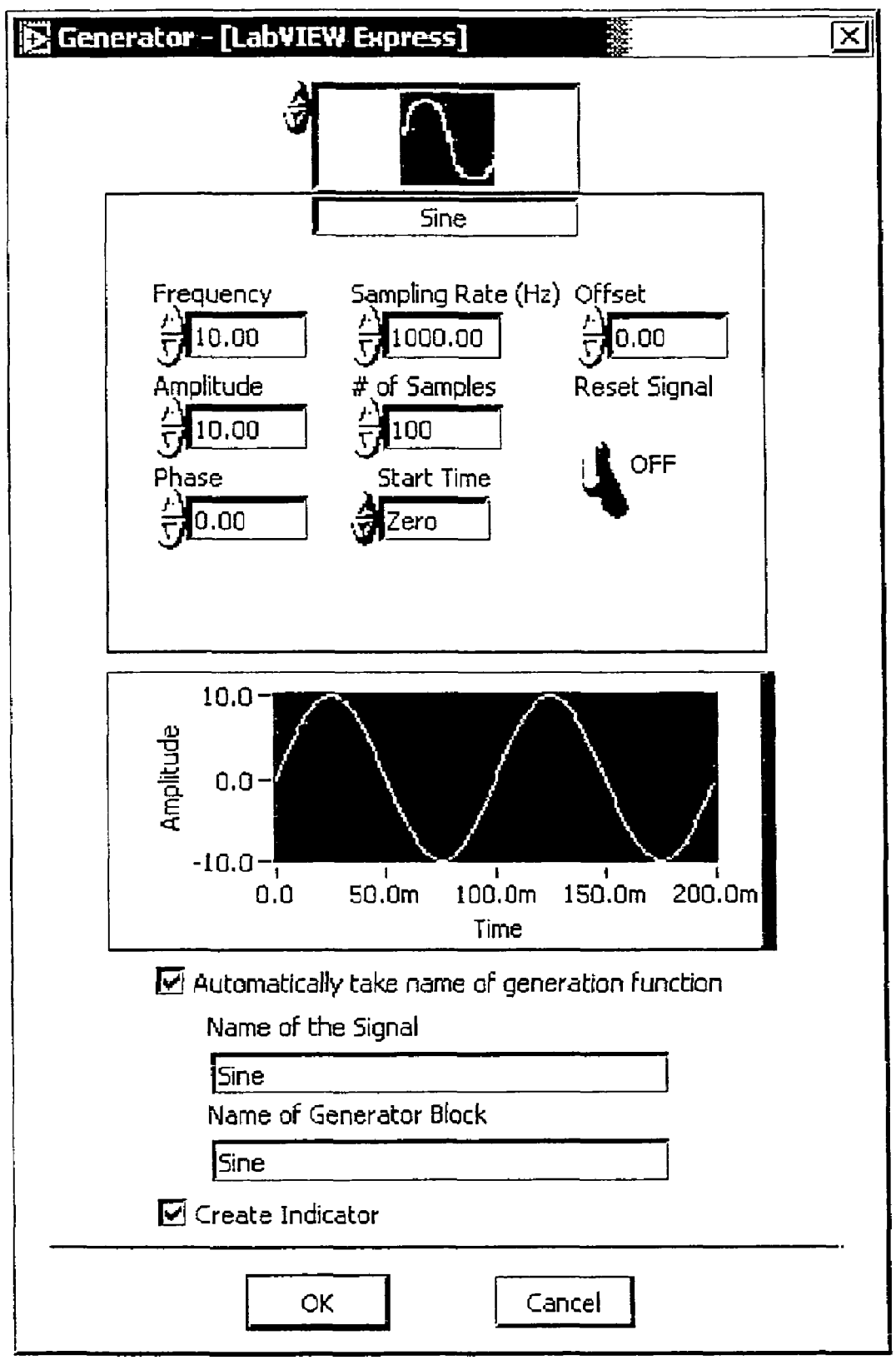
FIG. 17 illustrates an exemplary configuration user interface for configuring a waveform generator SDB node.

FIG. 17—Exemplary Configuration User Interface

As described above, in one embodiment, an SDB node may have an associated configuration user interface for receiving user input to configure the SDB node. FIG. 17 illustrates an exemplary configuration user interface for configuring an SDB node designed to generate waveforms. In response to the user specifying different settings for the GUI controls on the configuration user interface, different execution-time code may be programmatically generated for the waveform generator SDB node.

I/O Abstraction

A system and method for I/O abstraction may allow users to create graphical programs that are hardware independent through I/O abstraction. In one embodiment, I/O abstraction is a mechanism that allows the use of a generic I/O node in a block diagram that may be executing in different targets, or may be targeted for execution on one or more of a plurality of possible targets. The system and method for I/O abstraction may permit users to change physical I/O resources (e.g., change targets on which the graphical program is to execute) without modifying their graphical programs. For example, the system and method for I/O abstraction may permit users to use their graphical programs with different targets having different physical I/O resources without modifying their graphical programs.

In one embodiment, the system and method for I/O abstraction may include a graphical programming node, preferably a graphical program primitive (i.e., the I/O node) along with a well designed interface for the user and internal hardware engineer. In one embodiment, the I/O node may be implemented using the SDB node as discussed with reference to FIGS. 4-17. The user may be able to select hardware components and abstract the components using aliases. An alias refers to a particular I/O channel (e.g., analog in, analog out, digital in, or digital out) and possible I/O configurations for a particular set of hardware resources for the particular I/O channel. The internal hardware engineer may supply the system with the necessary hardware details to implement I/O abstraction. In one embodiment, the system and method for I/O abstraction may be implemented using Analog Input (ain), Analog Output (aout), Digital Input (din), Digital Output (dout), and other suitable modules.

The I/O abstraction capability may be useful for cases where the development cycle involves a simulation-emulation-target flow. In these cases, it is advantageous to preserve an existing investment in software from the prototyping stage to the target. For example, in a simulation-emulation-target flow, a graphical program may be expected to run on different targets during the design flow, where these targets may have different I/O resources. In this case, for example, graphical programs may heavily depend on system hardware. It would of course be desirable for the user to not have to rework source code for a graphical program each time the graphical program is desired to run on a different target. When an engineer writes a graphical program with analog output, for example, the code may be expected to work on all relevant hardware modules that support analog output (e.g., DAQ, FPGA, and Distributed I/O (e.g., NI-FieldPoint)).

Figure 18:
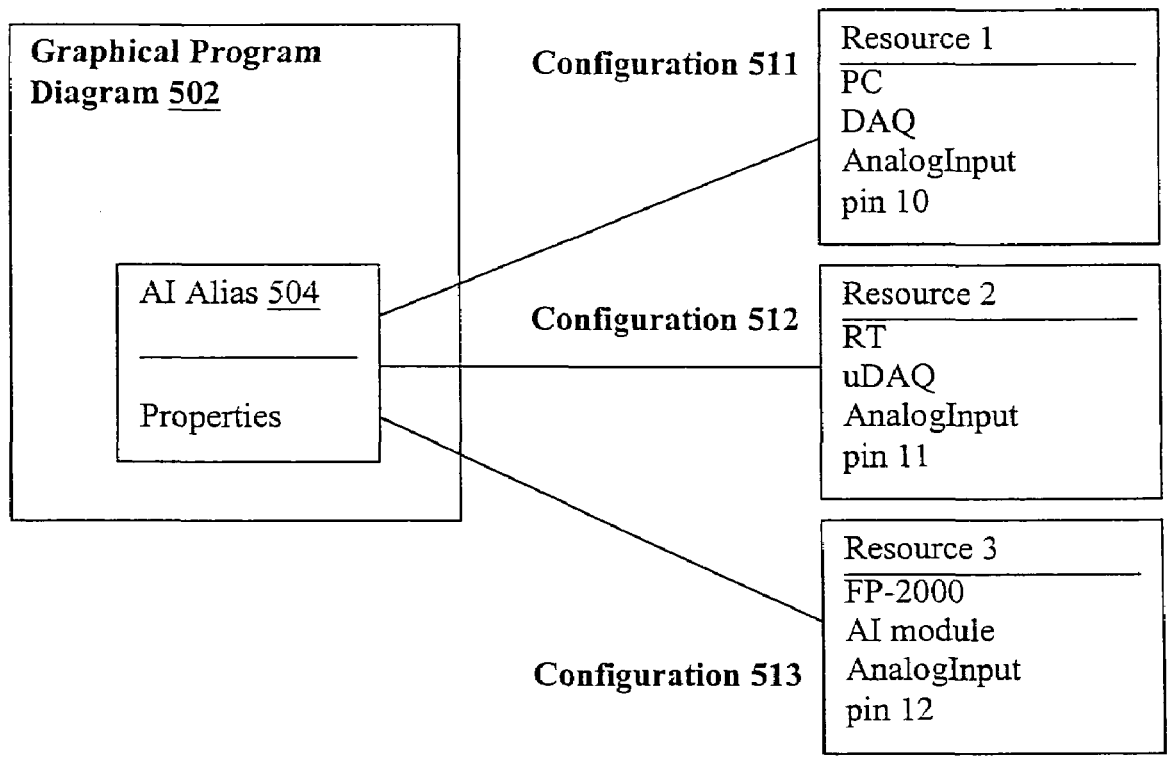
FIG. 18 shows an exemplary graphical programming diagram which includes an Analog Input alias according to one embodiment.
Figure 19:
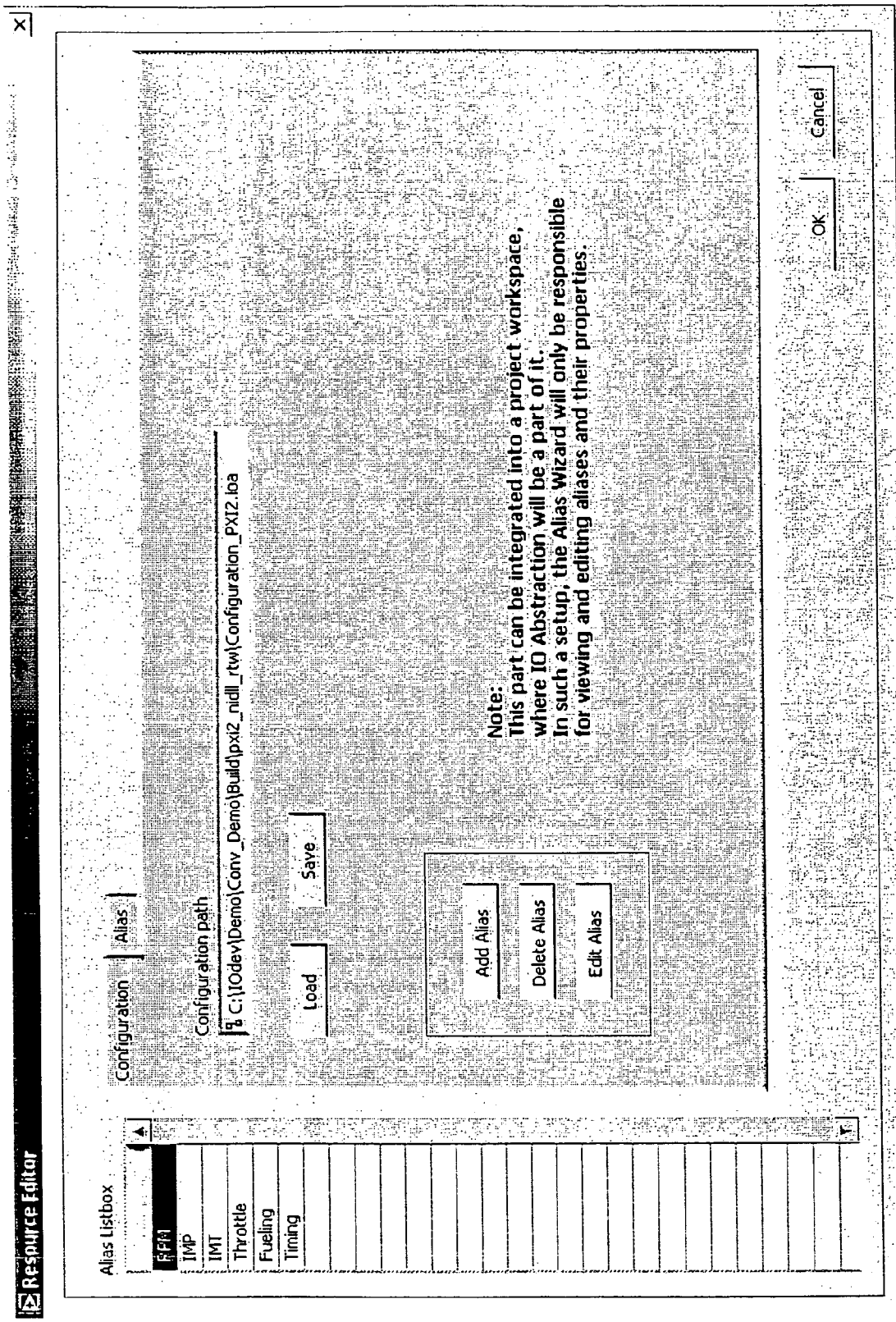
FIGS. 19 through 22 are screen shots which illustrate examples of a Resource Editor for an I/O node according to one embodiment.

The user may create a graphical program including one or more I/O nodes which contain aliases. The example graphical program diagram 502 shown in FIG. 18 includes an Analog Input alias 504 with properties such as scaling, range, and a resource pointer tied to current configuration. For purposes of example, three possible configurations 511, 512, and 513 for the analog input alias are shown. Configuration 511 refers to a personal computer having a data acquisition device or card, which supports analog input. Configuration 512 refers to a system having a chassis which includes a processor and memory and which is adapted to receive measurement modules, wherein the processor and memory execute LabVIEW-RT. One of the measurement modules supports analog input. Configuration 513 refers to a Fieldpoint-2000 system from National Instruments having an analog input module and which supports analog input. The term microDAQ used here (e.g., in Configuration 512) refers to a CompactRIO system described in U.S. Patent application Publication No. 20030074489 (Ser. No. 10/195,051) titled "Measurement System with Modular Measurement Modules That Convey Interface Information" and filed on Jul. 12, 2002, which is hereby incorporated by reference.

When the user wants to define a new implementation of the alias, he or she may create a new configuration file. The configuration file may contain the details about the resource that the alias will implement during compilation of the graphical program. A primary advantage of using configuration files is the ability to use the same graphical program without modification when I/O resources are modified.

In one embodiment, when the I/O is changed from PC/DAQ (a personal computer having a data acquisition device or card) to RT/microDAQ (LabVIEW RT running on a CompactRIO measurement module/chassis platform), for example, the user may only need to change the I/O configuration file. The graphical programming development environment (e.g., LabVIEW) may then automatically script (programmatically generate) the correct I/O implementation code into the graphical program. In other words, aliases may comprise abstracted I/O channels, and their implementation may depend on the current configuration file. (The term "script" is often used herein to refer to programmatically generating code.)

Figure 20:
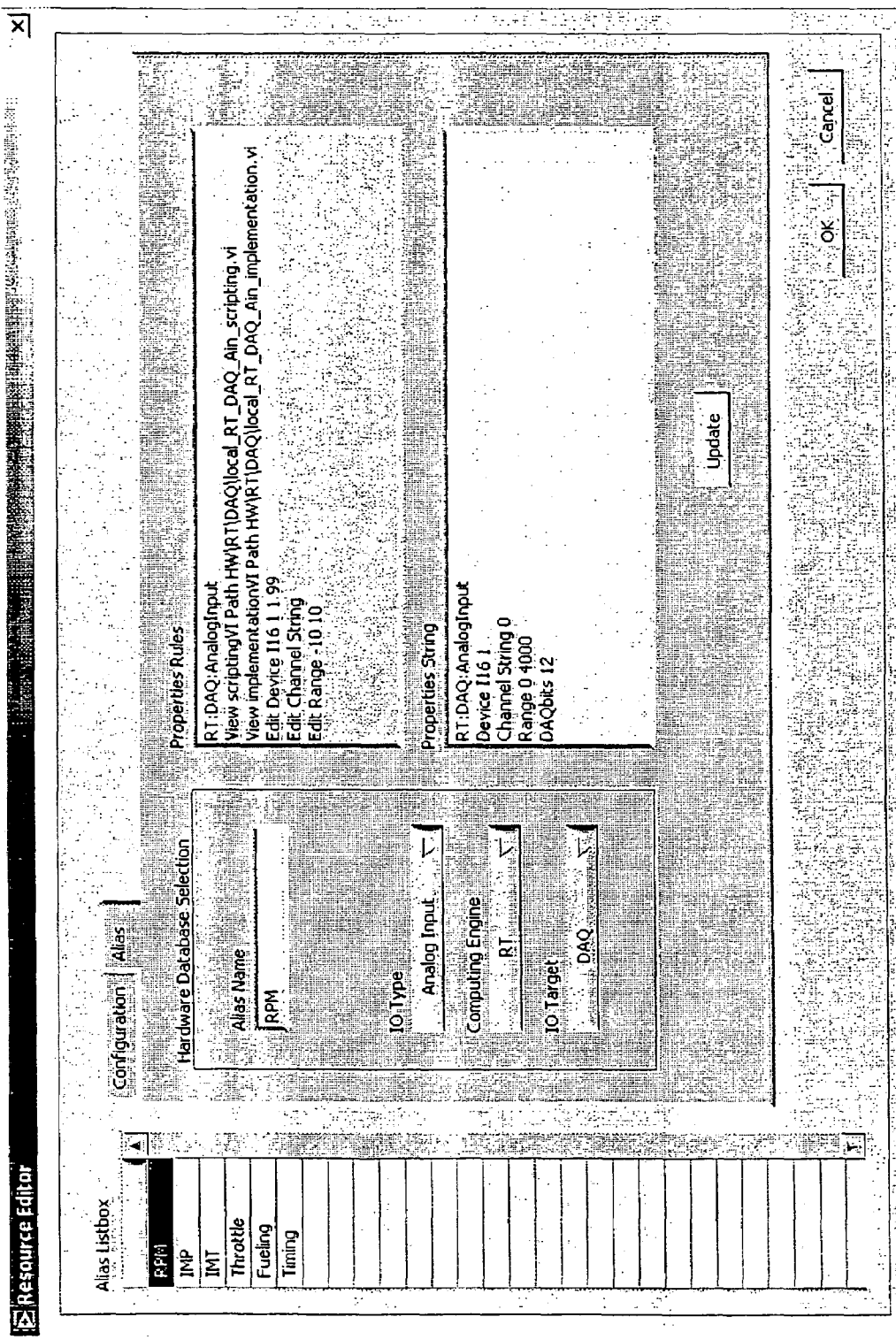

In one embodiment, the user may interact with the system via an I/O abstraction mechanism in two ways: using the Resource Editor and using the Alias dialog. FIGS. 19 through 22 are screen shots which show examples of the Resource Editor and Alias dialog. The Resource Editor allows users to edit configurations (e.g., describing resources and their properties) and map the configurations to specific aliases. As shown in the example of FIG. 20, once the aliases are defined in the Resource Editor, the user can start building a graphical program with I/O nodes that represent abstracted, single point I/O.

Figure 21:
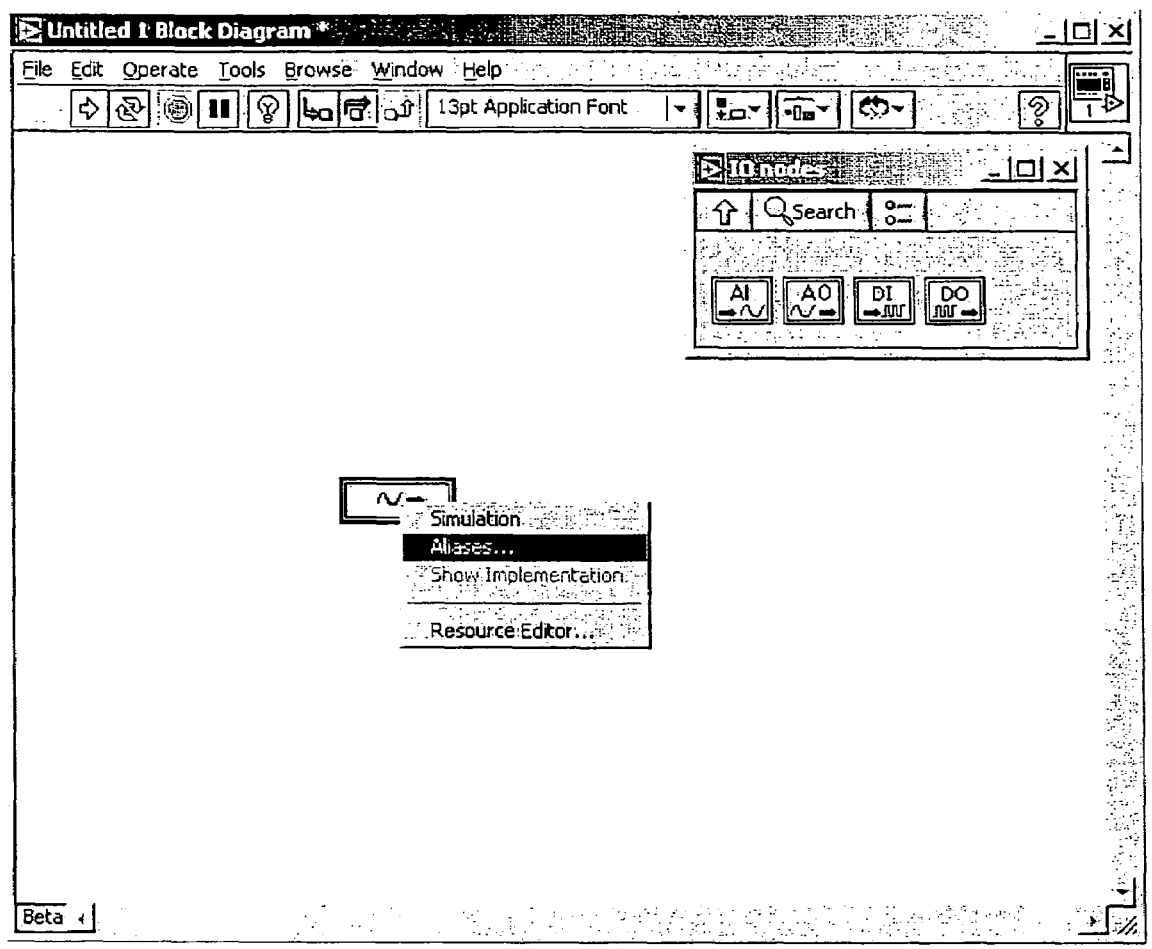
Figure 22:
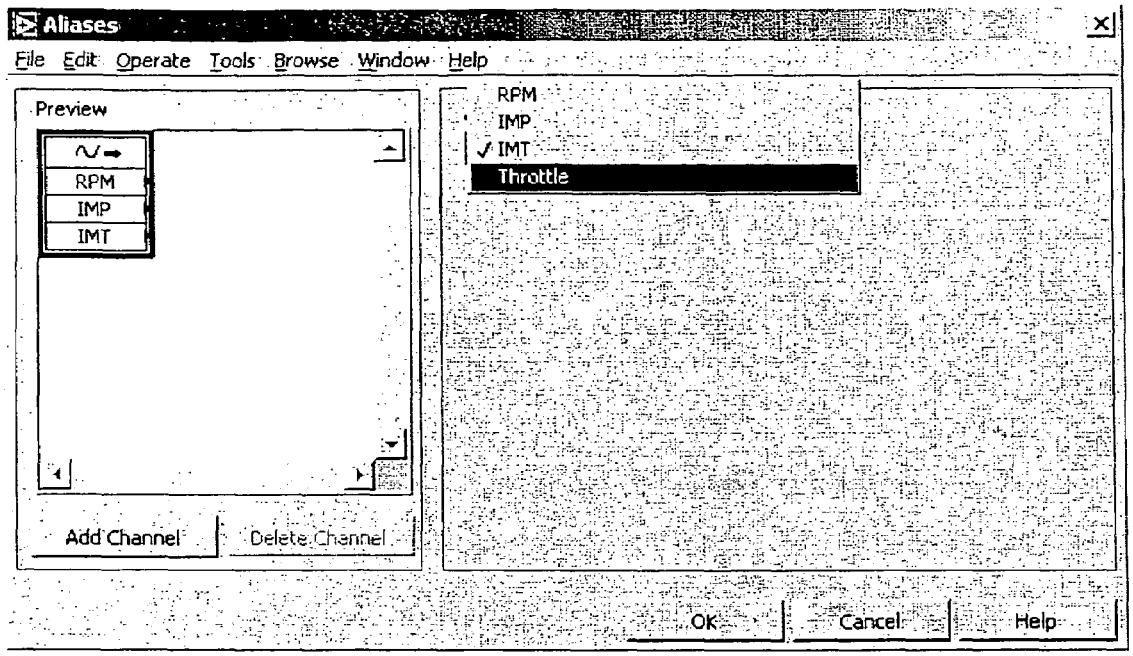

In one embodiment, after adding an I/O node to a graphical program and selecting Aliases from the popup menu as illustrated in FIG. 21, a dialog may be presented. FIG. 22 shows an example of the Alias dialog. The dialog allows users to select aliases from configuration that are defined for the current I/O type (e.g., analog in (ain), analog out (aout), digital in (din), digital out (dout), etc.) using a Resource Editor. The underlying implementation code (execution-time code) behind the I/O node may be scripted (programmatically generated) into the graphical program after aliases are selected. The implementation can be viewed by selecting "Show Implementation" from the popup menu. Once the graphical program is created, it may be executed on a different set of I/O hardware by loading a different configuration within the Resource Editor.

In various embodiments, the Resource Editor may permit the user to perform functions including, but not limited to: requesting hardware details and scripting implementation details from the Hardware Database; creating an array of aliases together with all information required by I/O node to script implementation (programmatically generate execution time code); saving and loading configurations (e.g., the mechanism to move to a different hardware platform); adding, deleting, and editing aliases; the user providing alias properties information (e.g., through a GUI); and verifying compatibility (e.g., error handling, correction). In one embodiment, the Resource Editor is global and is a part of the project workspace. Changes in the current configuration may therefore affect all I/O nodes inside graphical programs that are part of the project workspace.

In contrast to the global nature of the Resource Editor, the Alias dialog is local to a particular I/O node in one embodiment. The Alias dialog may permit the user to select aliases from the configuration list which are scripted (programmatically generated) into the graphical program under the I/O node, e.g., to programmatically generate execution-time code that is associated with the I/O node.

Figure 24:
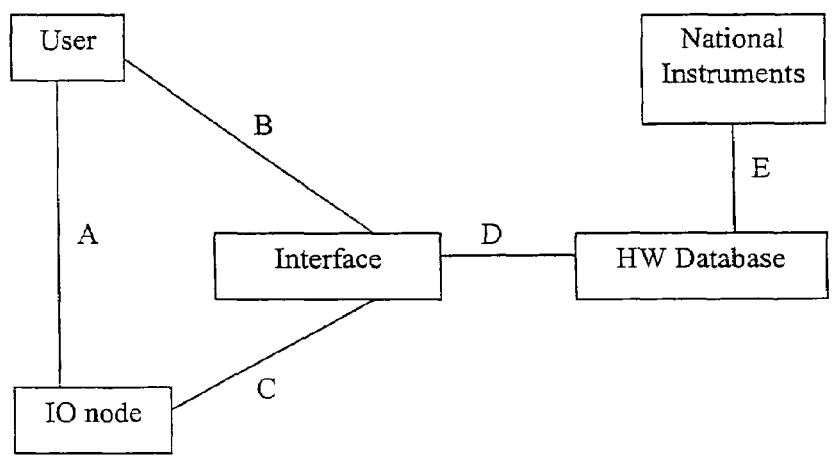
FIG. 24 illustrates a basic implementation model for I/O nodes according to one embodiment.
Figure 23:
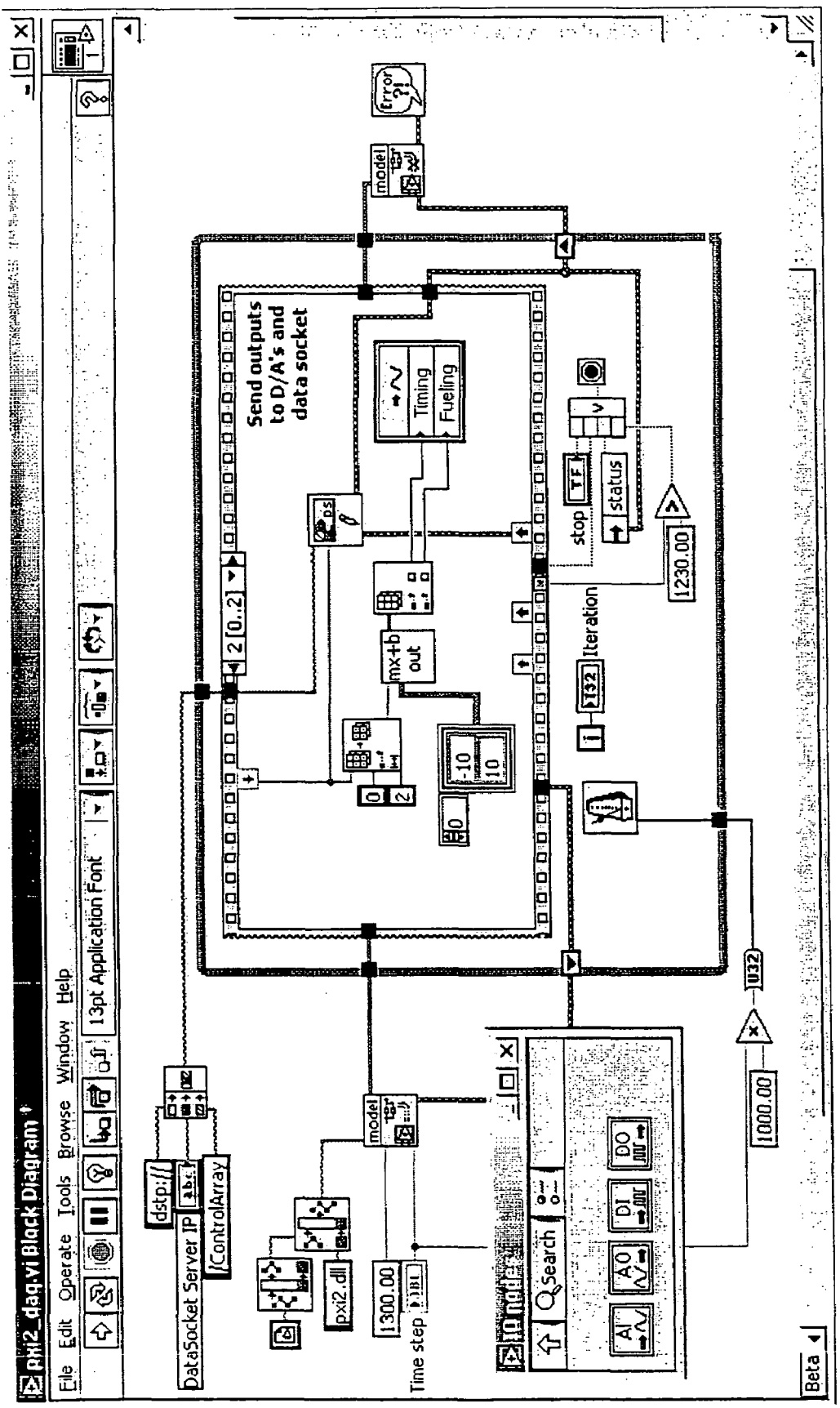
FIG. 23 illustrates an exemplary graphical programming diagram including a graphical program using I/O nodes according to one embodiment.

FIG. 23 illustrates an example of a graphical program using I/O nodes. The example shown in FIG. 23 uses the following convergence demo. The convergence demo uses a Hardware-In-Loop (HIL) testing model, where two separate I/O systems represent the Engine Controller and the Engine Model. During the course of testing, the hardware implementation of the HIL may change to include devices shown in the table below:

FIG. 24 illustrates a basic implementation model according to one embodiment. A user may specify static hardware information included in a Hardware Database. The Hardware Database may include details about any supported hardware and implementations. A graphical interface may facilitate data transfer among the user, Hardware Database, and I/O node. The I/O node may comprise a graphical programming primitive that allows the user to develop hardware independent code (e.g., as

|  | Bench Top | microDAQ (model) | MPC565 embedded |
|---|---|---|---|
| Engine Controller | LabVIEW-RT with DAQ | LabVIEW-RT with RIO (Lab VIEW-FPGA) | MPC565 with IO |
| Engine Model | Lab VIEW-RT with DAQ | Lab VIEW-RT with DAQ or DAQ/physical engine | physical engine | implemented by an SDB node).

In one embodiment, the Hardware Database holds information relating to hardware supported by the graphical program development environment, both external and internal. In one embodiment, a particular entry (class) in the database may be identified by the three categories below:

1. Execution Engine (where the implementation code will run, such as: PC, RT, FPGA, MPC565, etc.)
2. I/O Module (I/O point, such as: DAQ card, microDAQ, FieldPoint module, FPGA channels, etc.)
3. I/O Type (e.g., Analog Input/Output, Digital Input/Output)

Figures 25, 26:
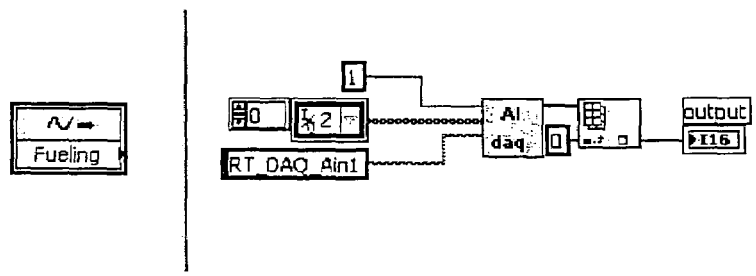
FIG. 25 illustrates a Hardware Database array according to one embodiment.
FIG. 26 shows an example of implementation code for RT/DAQ/Analog Input entry according to one embodiment.

FIG. 25 illustrates a Hardware Database array according to one embodiment. Each entry in the database is a class and will have a list of properties and methods associated with it. As shown in FIG. 25, some classes may be empty because the execution engine may not support certain I/O modules. In some embodiments, for example, an FPGA target may not be able to support DAQ devices because they cannot be connected directly and because an FPGA may not be configurable to initiate LV-LV (LabVIEW to LabVIEW) communication. Other entries may be able to support certain I/O modules only through LV-LV communication. Real-time (LabVIEW-RT), for example, may be able to run I/O on an FPGA by connecting to the RI/O board through the PXI backplane, downloading personality code to the FPGA execution engine, and calling I/O routines through the Host Interface mechanism.

Due to the growing number of supported execution engines and I/O modules, the complexity of the Hardware Database is expected to increase in time. In the interests of allowing developers to easily modify existing properties and add new properties in the future, naming conventions may be observed. In one embodiment, these naming conventions may be enforced through software to ensure that the same concepts have the same property names. For example, resourceName (FPGA), channel (DAQ), and I/O should each have the same property name from I/O module to I/O module.

In one embodiment, in addition to supporting native configuration options, external or third party computing node configuration software (e.g. UNIS Processor Expert/Beans) may be used create a framework that organizes the way properties and methods are defined and entered into the database. In one embodiment, the customer GUI may also be modeled by such third party configuration software. The user would be able to select from a list of properties already defined in the imported configuration node and edit the properties in a dialog box. The external configuration software could be used in a similar way to define execution engines with static characteristics (e.g., memory size, CPU type) and dynamic characteristics (e.g., memory configuration, mode, I/O configuration), again in addition to the native configuration software.

In one embodiment, the Hardware Database may include the following mandatory properties for each class in the Database:

1. Scripting graphical program path: I/O node will run it directly to script code to graphical program
2. Implementation graphical program path: I/O code specific to current entry scripted by "scripting graphical program"
3. Class name In one embodiment, other properties and methods may be specific to the particular class. Examples may include Device and Channel (e.g., for DAQ card), ResourceName (e.g., for FPGA), and scaling and precision bits (e.g., for analog types).

In one embodiment, the I/O node uses the SDB node for its implementation. When the user selects a set of aliases from the list, the I/O node scripts the implementation graphical programs retrieved from the Hardware Database into the owning graphical program. The implementation may be viewed by selecting an option such as "Show Implementation" from the I/O node popup dialog. FIG. 26 shows an example of implementation code for RT/DAQ/Analog Input entry.

In one embodiment, a simulation option may be provided to require a default simulation behavior defined for all aliases. If the simulation option is selected, every resource is expected to have a simulation graphical program that will be included in the configuration file. In one embodiment, selecting the simulation option will script that simulation graphical program. The simulation option may be useful, for example, in situations where one of the I/O points doesn't work (wire was cut), in quick prototyping without I/O module, and in running through a simulated voltage ramp to test system behavior.

In one embodiment, an I/O node may give a FPGA graphical program a mechanism to interface with the single point I/O resources available to it. I/O nodes for FPGA may be added to the graphical program, configured and grown through a dialog, and have their internal contents scripted.

In one embodiment, I/O nodes are expandable, for example, to allow a new board developer to specify new I/O and implementations of that I/O without modification to of the larger I/O node code base. In other words, the I/O nodes may include a plug-in architecture. In one embodiment, the plug-in architecture may provide support for the microDAQ case: that is, for I/O that can make itself available depending on the current configuration and allow custom configuration of that IO, as well as properties and methods on that IO. I/O resources which are listed through the Resource Manager may make themselves available for selection and configuration from the I/O Nodes.

As a plug-in is developed, it may be placed into a directory structure, either alongside or similarly to the directory structure of the resource manager. When an I/O node is added to a graphical program, the directories may be examined and the type of the plug-in will be added to a list (e.g., if microDAQ) or selected by default (e.g., if base I/O is that of the target). In one embodiment, one of the graphical programs in the directory of this plug-in may be a configuration GUI, and the configuration GUI may be placed into a sub-panel on the configuration dialog when the plug-in is selected. This panel may be responsible for presenting any plug-in specific configuration options to the user and bundling the configuration into a single configuration state.

The selection of the plug-in and the configuration state may then be used together to both specify the appearance and interface of the node and provide the internal implementation. A graphical program within the directory may be responsible for drawing a picture representing the node's appearance and for specifying the data-type of its inputs/outputs given the configuration state. Another graphical program within the directory may then be responsible for creating the internal implementation, either by scripting a module generated graphical subprogram into place or by scripting an underlying implementation.

In one embodiment, properties and methods on I/O nodes may operate in a similar way to the nodes themselves. A configured I/O node, through a graphical program in its directory, may list the properties and methods which are valid for it. Additional graphical programs may specify the node's appearance, interface, and script the internal implementation. A method of communicating between a property/method and its owning I/O node may often be useful, either through shared graphical subprograms, global variables, or by requesting resources through the resource manager.

For each I/O node placed on the diagram and configured, the plug-in may be responsible for taking the configuration information and scripting the contents of the external node appropriately. In FPGA mode, hardware code may be generated from these contents, e.g., either from FPGA's code-to-hardware translation or by module generating the graphical subprogram inside the node. In emulation mode, that same code may be run on the host computer and should in that context provide the I/O layer to the emulated implementation code. It should check the personality downloaded to the board, download an appropriate ghost personality if necessary, and interact with that personality to provide the I/O to the running emulated personality.

In one embodiment, the Host interface may enable new devices to be accessed without modification of the base implementation. Several pieces of information may be necessary to script a working host interface, including, but not limited to: the mapping of controls to register addresses; the mechanism for downloading a personality to the board; the mechanism for reading and writing to controls; interrupt handling; and possibly DMA. In each one of these areas, the host interface may need to make different decisions or even script different underlying code depending on the type of target selected. These pieces of information may be board dependent and/or hard-coded.

In configuring the host interface open node, the user may be required to choose the type of board which this host interface will support. In one embodiment, only boards in this system that are of this type will be presented as targets, and only an external refnum that is of this board type will be allowed as an input without error. These procedures may allow the host interface to script into place code that is specific to the selected target, rather than having to dynamically call a download graphical program by reference and requiring the reads and writes, for example, to be peeks and pokes to a 0x8100 address. The target selection may be propagated from node to node in the refnum along with other configuration options of the host interface. In various embodiments, this scripting may be implemented by either providing an implementation graphical program that will be scripted by the default scripting code or by providing a full custom implementation scripted by a plug-in graphical program.

In one embodiment, the system and method for I/O abstraction may be especially suited for real-time (RT) implementation because every possible download implementation need not be provided to the RT controller. Furthermore, the system and method for I/O abstraction is expected to provide more efficient, smaller graphical programs. It may be desirable to provide for different targets to be accessible from the same host interface. Scripted code may successfully access both boards, but the gain of not forcing a target reselection might be offset in user confusion.

In one embodiment, running a graphical program in FPGA interactive mode has similar issues to the host interface. As new targets are introduced, new methods to download and communicate with the graphical program may be desirable. In a preferred embodiment, the same plug-in graphical programs used for the host interface may be leveraged for interactive mode. This duplication may reduce the workload on a plug-in developer and reduce the chances for error or for differences to arise between interactive and host interface versions. In one embodiment, the entirety of the host interface may be used for interactive functionality, and a custom host interface application may be scripted behind the scenes for each graphical program run interactively. In another embodiment, graphical programs may be provided by the plug-in developer and can be called dynamically by the interactive mode framework for all functionality which is scripted by the host interface plug-in. Graphical programs that are simply called by the host interface may be able to be reused transparently by interactive mode.

Figure 27:
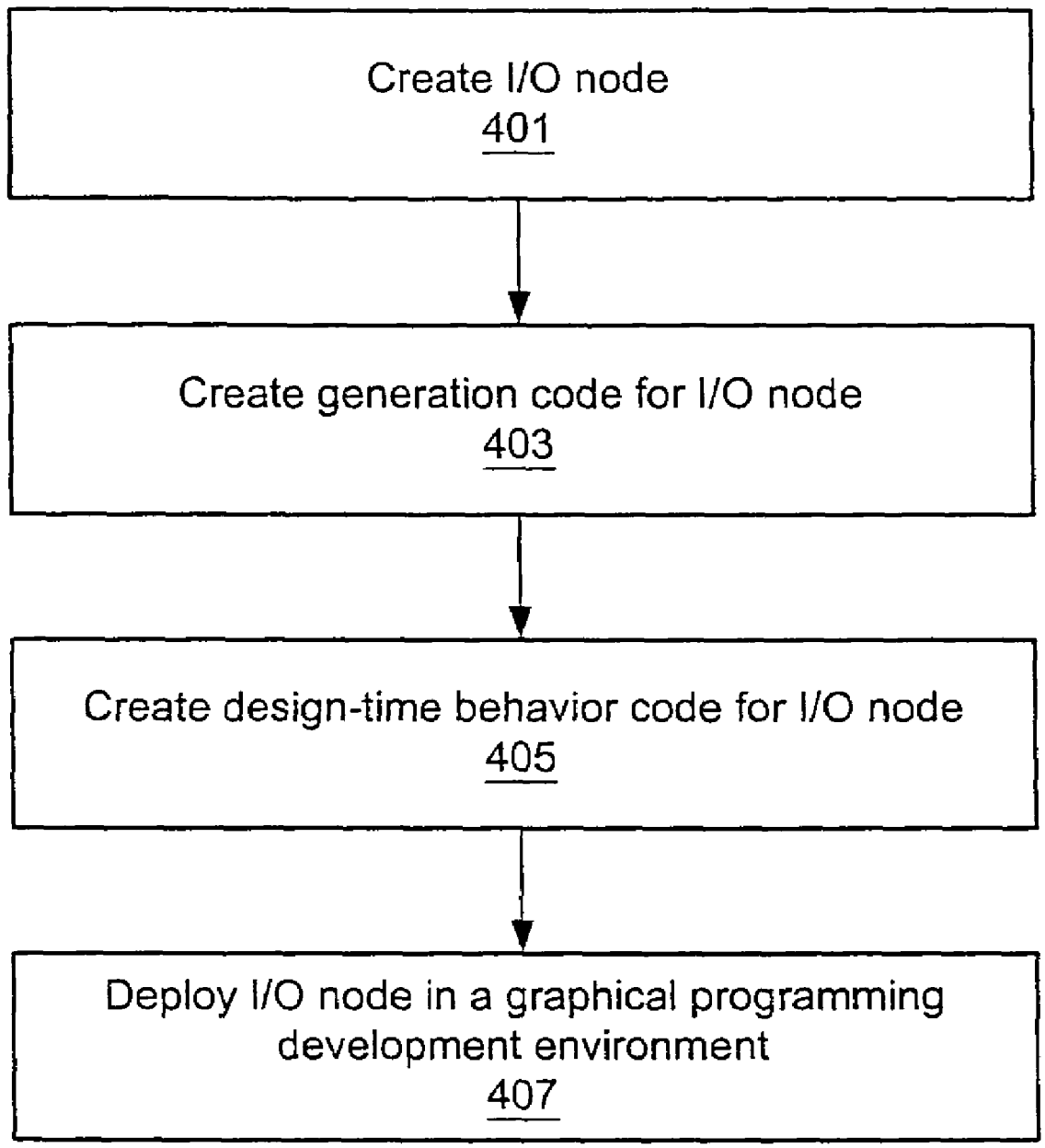
FIG. 27 is a flowchart diagram illustrating one embodiment of a method for creating an I/O node.

FIG. 27—Creating an I/O Node

FIG. 27 is a flowchart diagram illustrating one embodiment of a method for creating an input/output (I/O) abstraction node. It is noted that FIG. 27 illustrates a representative embodiment, and alternative embodiments are contemplated. Also, various steps may be combined, omitted, or performed in different orders, etc.

In 401, the I/O node may be initially created. For example, the user may request a graphical programming development environment to create an initial or default I/O node, e.g., by utilizing a menu command or providing other input to the graphical programming development environment. In response, the graphical programming development environment may create or store initial or default data structures representing the I/O node. The data structures may include a default icon for display when the I/O node is included in a graphical program. The user may later specify another iconic appearance that better indicates the functionality of the I/O node.

In 403, generation code associated with the I/O node may be created, e.g., in response to user input. The user may specify generation code operable to programmatically generate desired execution-time code for the I/O node. As described herein, the generation code may be operable to generate the execution-time code in response to or based on various types of input, events, or conditions. Also, the generation code may be operable to determine various types of code generation dependency information that affects the generation of the execution-time code.

As described above, the generation code may include code of any kind, including graphical code, text-based code, or other types of code, and the code may be associated with the I/O node in any of various ways. In one embodiment, a graphical user interface for specifying the generation code may be displayed, and the user may interact with this graphical user interface to specify the generation code. For example, in one embodiment, the generation code may include graphical code located in a block diagram. Thus, for example, a graphical user interface, e.g., a panel or window, for creating the block diagram may be displayed. The user may interact with the graphical user interface to specify the inclusion of various nodes or other elements in the block diagram, specify interconnections among the nodes, configure properties or parameters of the nodes, etc.

In another embodiment, the generation code may include text-based code. Thus, 403 may include creating or filling in one or more functions, methods, or other procedures with text-based code operable to programmatically generate execution-time code for the I/O node when executed.

In 405, design-time behavior code associated with the I/O node may be created, e.g., in response to user input. The user may specify design-time behavior code operable to affect various aspects of design-time behavior of the I/O node (e.g., based on the nature of supported I/O resources). The design-time behavior code may be operable to affect design-time behavior of the I/O node in response to or based on various types of input, events, or conditions. In one embodiment, the design-time behavior code may execute in response to user input received, such as user input to edit a graphical program in which the I/O node has been included.

Similarly as described above, the design-time behavior code may include code of any kind, including graphical code, text-based code, or other types of code, and the code may be associated with the I/O node in any of various ways. For example, in one embodiment, the design-time behavior code may include graphical code located in a block diagram. Thus, graphical design-time behavior code may be included in the block diagram. In another embodiment, the design-time behavior code may include text-based code.

As described above, in one embodiment, the design-time behavior code may be packaged together with the generation code. For example, the design-time behavior code and the generation code may each include graphical code located within a common node behavior characterization block diagram. Thus, 403 and 405 may be combined. Also, in one embodiment, the I/O node may not have associated generation code or may not have associated design-time behavior code, and thus 403 or 405 may not be performed. Also, in one embodiment, the generation code and/or the design-time behavior code may be pre-existing before the I/O node is created or may be created using an application other than an application used to create the I/O node. Thus, 403 and/or 405 may comprise supplying a reference to such code.

The initial or default data structures representing the I/O node may be updated to include or reference the created generation code and design-time behavior code. Data structures and/or program instructions representing the I/O node may be stored, e.g., may be persistently stored on a memory medium. Storing the I/O node may include storing the generation code and design-time behavior code with the I/O node. In one embodiment, the generation code and/or the design-time behavior code may be converted to another format, which may also be stored.

In one embodiment, creating the I/O node may also comprise specifying an interface for connecting the I/O node to other nodes in a block diagram, e.g., by specifying one or more input and/or output terminals for the I/O node. During execution of the graphical program, the execution-time code of the I/O node may utilize inputs connected to the input terminals.

In one embodiment, creating the I/O node may also include creating a configuration user interface for the I/O node.

As indicated at 407, in one embodiment the created I/O node may be deployed in a graphical programming development environment. Deploying the I/O node in the graphical programming development environment may include enabling the graphical programming development environment to allow users to include the I/O node in graphical programs created using the graphical programming development environment. For example, the I/O node may be created using an application, e.g., a graphical programming development environment application, installed on a first computer system. One or more files representing the I/O node may then be stored on a second computer system (or a memory medium accessible from the second computer system), such that when a graphical programming development environment installed on the second computer system is executed to create or edit a graphical program, the graphical programming development environment allows a user to include the I/O node in the graphical program. For example, the I/O node may appear or be listed in a palette or library of nodes available for inclusion, or the user may be able to select one or more files representing the I/O node to request the I/O node to be included.

Thus, for example, an I/O node may be created by a first user and then deployed in a graphical programming development environment on a second user's computer system. The second user may then create a graphical program that uses the I/O node created by the first user. For example, the first "user" may be the vendor of the second user's graphical programming development environment. Thus, the I/O node may be installed along with the graphical programming development environment on the second user's computer system, or may be deployed in the graphical programming development environment at a later date. Also, the first user may be a third-party developer who creates a library of graphical program nodes to provide additional functionality.

In another embodiment, the same user who creates an I/O node may also create a graphical program that uses the I/O node. Thus, it may not be necessary to perform 307 since the I/O node may already be accessible from the user's graphical programming development environment.

Figure 28:
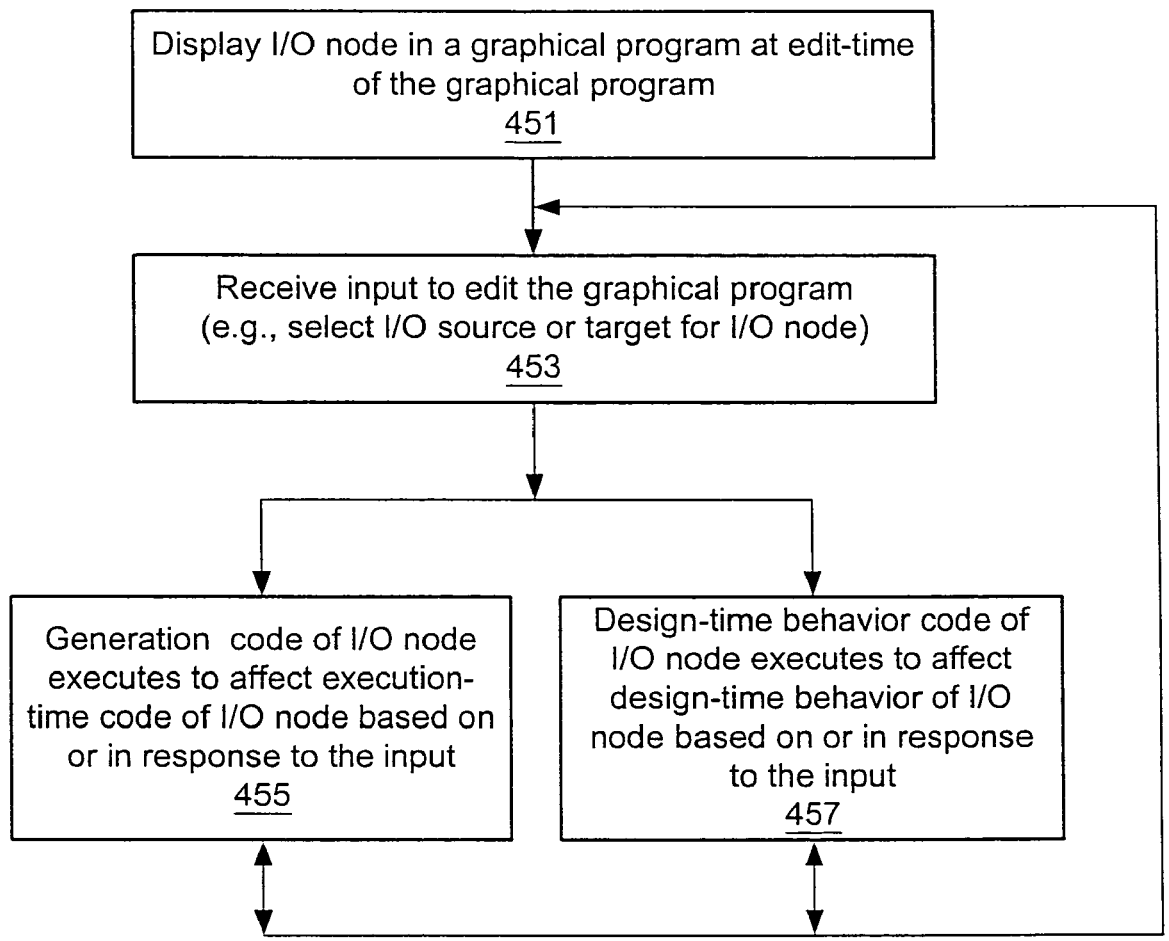
FIG. 28 is a flowchart diagram illustrating one embodiment of a method for creating a graphical program that utilizes an I/O node.

FIG. 28—Creating a Graphical Program that Utilizes an I/O Node

FIG. 28 is a flowchart diagram illustrating one embodiment of a method for creating a graphical program that utilizes an input/output (I/O) abstraction node. It is noted that FIG. 28 illustrates a representative embodiment, and alternative embodiments are contemplated. Also, various steps may be combined, omitted, or performed in different orders.

In 451, an I/O node may be displayed in a graphical program at edit-time of the graphical program, i.e., as the graphical program is being created or edited. For example, the I/O node may be displayed in a block diagram of the graphical program in response to a user requesting to include the I/O node in the block diagram. The I/O node may be one of a plurality of nodes in the block diagram. The graphical program or block diagram may be created or assembled by the user arranging on the display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons that visually indicate the functionality of the program. As described above, a user interface or front panel for the graphical program may also be created, e.g., in response to user input.

In 453, input to edit the graphical program may be received. Based on the input received and/or in response to the input received, the generation code of the I/O node may execute in 455 to programmatically generate or affect execution-time code of the I/O node, and/or design-time behavior code of the I/O node may execute in 457 to affect design-time behavior of the I/O node.

The generation of the execution-time code of the I/O node may be performed based on or in response to any of various kinds of input received in 453. In one embodiment, the input may comprise input to a block diagram of the graphical program. For example, the input may be received in the process of creating the plurality of interconnected nodes as described above.

As one example, the input received in 453 may include input specifying the connection of one or more inputs to input terminals (and/or output terminals) of the I/O node. For example, the generation code of the I/O node may be operable to programmatically generate execution-time code based on data types of the inputs (or outputs). For example, the generation code may enable the I/O node to exhibit polymorphic behavior, as discussed in more detail below. Also, the execution-time code may be programmatically generated based on one or more values of the connected inputs. For example, if a constant integer input value within a first range is connected to the I/O node, first execution-time code may be generated, wherein the first execution-time code has first functionality, and if a constant integer input value within a second range is connected to the I/O node, second execution-time code may be generated, wherein the second execution-time code has second functionality.

As another example, the execution-time code may be generated based on which particular subset of inputs are connected to the I/O node. The I/O node may have a plurality of input terminals, but the user may not be required to connect inputs to all of the terminals. As a simple example, consider an I/O node having a first input terminal, wherein an input connected to the first input terminal may affect execution behavior of the I/O node, or there may be no effect on the execution behavior of the I/O node if no input is connected to the first input terminal. Thus, if no input is connected to the first input terminal, then the generation code may programmatically generate execution-time code for the I/O node that does not include logic for checking the value of an input connected to the first input terminal and responding to the input value. This may result in the execution-time code being smaller and more efficient.

In a case in which the execution-time code is generated based on which particular subset of inputs are connected to the I/O node, it may be difficult to know at edit-time which inputs will eventually be connected to the I/O node. In one embodiment, the generation code may execute each time the subset of connected inputs changes and may interactively re-generate or modify the execution-time code each time based on the connected inputs. In another embodiment, it may be desirable to generate the execution-time code a single time, e.g., after the user has finished editing the graphical program. For example, the generation code associated with the I/O node may be executed to generate the execution-time code when the graphical program is compiled or just prior to execution of the graphical program. Thus, in various embodiments, the generation code may execute to generate execution-time code for the I/O node based on input received to edit the graphical program, but may not execute immediately in response to the input.

As another example, the execution-time code may be generated based on which other nodes the user includes in the graphical program or based on the configuration of other nodes in the graphical program. As a simple example, consider an I/O node designed to analyze data acquired from an acquisition node, wherein the acquisition node is configurable to acquire data from different types of sources. It may be desirable to analyze the data differently, depending on the source type from which the data is acquired. For example, if the user configures the acquisition node to acquire data from a first source type, the generation code of the I/O node may execute to generate first execution-time code having first functionality, and if the user configures the acquisition node to acquire data from a second source type, the generation code of the I/O node may execute to generate second execution-time code having second functionality, wherein the first functionality is different than the second functionality.

In various embodiments, the execution-time code for the I/O node may be generated or modified based on or in response to user input received to configure the I/O node in the graphical program. The I/O node may be able to take on different functionality in the graphical program, depending on configuration user input received. For example, the node may be generally related to a particular functional realm, such as data acquisition, signal analysis, data display, network communications, etc. However, until configuration user input is received for the node, the exact execution-time behavior of the node within the graphical program may be undefined.

In one embodiment, the I/O node may have a configuration user interface for configuring the I/O node, e.g., for specifying desired execution-time functionality of the I/O node. For example, the configuration user interface may include one or more graphical panels or windows. The configuration user interface may comprise information useable in guiding the user to specify desired functionality for the I/O node. The I/O node may be configured to perform a variety of functions within the graphical program, depending on user input received to the configuration user interface. As noted above, the node may be generally related to a particular functional realm, such as data acquisition, signal analysis, data display, etc. Thus, the configuration user interface may display information related to the particular functional realm. For example, for an I/O node related to network communications, the configuration user interface may include GUI controls for specifying a data source or target to which to connect when the I/O node is executed, specify a connection protocol to use, etc.

Thus, in one embodiment, creating the I/O node as described above may also include creating a configuration user interface for the I/O node. After the I/O node has been included in the graphical program, the user may invoke the configuration user interface to configure the I/O node, e.g., by double-clicking on the I/O node, selecting a menu option to request to configure the I/O node, or in any of various other ways.

Thus, in one embodiment an I/O node may be configured to perform a plurality of operations, depending on user input specifying configuration information for the I/O node. The configuration user interface may enable the user to specify one or more desired operations for the I/O node from the plurality of possible operations. However, since the execution-time code associated with the I/O node may be generated programmatically, a "minimal" amount of execution-time code may be generated, i.e., only code necessary to implement the one or more specified operations may be generated. Thus, code corresponding to operations from the plurality of operations that are not among the one or more specified operations may not be included in the graphical program. Associating a minimal amount of execution-time code with a node in a graphical program node in this way may be advantageous in some situations, e.g., by reducing the size of the graphical program.

In various other embodiments, the execution-time code for the I/O node may be generated based on any of various other kinds of input to edit the graphical program. For example, in one embodiment, the generation code may be operable to generate the execution-time code in response to displaying the I/O node in the graphical program in 451. In another embodiment, receiving input to edit the graphical program in 453 may include receiving input to edit a user interface or front panel of the graphical program, and the execution-time code may be programmatically generated based on this input.

Referring again to FIG. 28, 457 illustrates that in one embodiment, design-time behavior code of the I/O node may execute to affect design-time behavior of the I/O node based on or in response to the input received to edit the graphical program. In various embodiments, the design-time behavior code may affect any of various aspects of the design-time behavior of the I/O node. For example, the design-time behavior code may affect a user's experience of interacting with or viewing the I/O node when editing the graphical program. In one embodiment, the design-time behavior code may execute in response to user input received to a block diagram of the graphical program. For example, the user input may be received in the process of creating the plurality of interconnected nodes as described above.

In some embodiments, the user input may be received to the I/O node itself. For example, user input to the I/O node may include: selecting the I/O node; clicking on the I/O node (e.g., left-clicking, right-clicking, or double-clicking); re-sizing the I/O node; moving the I/O node to another location within the block diagram; moving a mouse cursor over the I/O node; etc.

As one example, the design-time behavior code of the I/O node may be operable to display a custom context menu or popup menu for the I/O node, e.g., in response to the user right-clicking on the I/O node. For example, the context menu may include items operable to invoke a user interface to configure the I/O node or checkable Boolean items indicating desired properties of the I/O node. For example, these properties may affect the generation of the execution-time code for the I/O node. The menu items may also allow the user to specify desired edit-time behavior of the I/O node, e.g., whether to dynamically change the input/output terminals of the I/O node as described below.

As another example, the design-time behavior code may be operable to change the number of input/output terminals of the I/O node and/or may affect the terminal names. For example, after the user has configured the I/O node using a configuration user interface such as described above, some of the possible input/output terminals may not be applicable. Thus, the design-time behavior code may execute to dynamically display only relevant terminals. For example, before the user configures the I/O node, a first output terminal may be displayed. If the first output terminal is no longer relevant after the user configures the I/O node, the design-time behavior code may cause this terminal to be hidden. Similarly, if a first input terminal is hidden before the user configures the I/O node, the design-time behavior code may cause the first input terminal to be displayed after the user configures the I/O node if the new configuration requires input to this terminal or makes the terminal relevant.

The terminals of the I/O node may also be affected depending on any of various other kinds of input. For example, if the user connects an input of a first data type to a first input terminal that makes a second input terminal irrelevant, then the second input terminal may be hidden. As another example, if the user connects an input of a first data type to a first input terminal, then a displayed name for the first input terminal or for another terminal may be changed, e.g., to more precisely indicate the purpose of the terminal.

As another example, the design-time behavior code may be operable to change the iconic appearance of the I/O node within the graphical program. For example, the I/O node may have a default icon, and the design-time behavior code may dynamically change the icon depending on how the I/O node has been configured within the graphical program, e.g., depending on input received to a configuration user interface, depending on inputs connected to the I/O node, depending on which nodes the I/O node provides outputs to, etc. As an example, consider a polymorphic I/O node operable to perform a polymorphic operation on two inputs. The icon for the I/O node may be dynamically changed depending on the data types of inputs the user connects to the I/O node, e.g., to more descriptively represent the operation of the I/O node. The new icon may take on any of various shapes or sizes. For example, most nodes in the graphical program may be displayed using an icon of a fixed size, e.g., 32×32 pixels. However, the I/O node may be represented using a larger or smaller icon, as appropriate. Also, an I/O node may be displayed using an icon of any arbitrary shape in addition to square or rectangular icons. For example, the shape and appearance of the icon may change depending on user input.

As another example, the design-time behavior code may be operable to affect the I/O node's behavior in response to the user moving a mouse cursor over the I/O node. For example, the design-time behavior code may display an informative message which may vary depending on the current configuration of the node. As another example, if some of the I/O node's input/output terminals have been hidden as described above, then the design-time behavior code may cause all of the terminals to be temporarily displayed while the mouse cursor is located over the I/O node.

In various embodiments, a user interface or dialog may be displayed for various other purposes besides configuring functionality of the I/O node and may be displayed in response to any of various causes or conditions. As one example, if the user connects an input having an invalid data type to an input terminal of the I/O node, the design-time behavior code may be operable to display a dialog informing the user of the error and informing the user how to correctly use the I/O node.

In one embodiment, both the generation code and the design-time behavior code may execute in response to a given input to edit the graphical program. As one example, in response to receiving input via a configuration user interface to configure the I/O node, the generation code may execute to generate execution-time code based on the specified configuration, and the design-time behavior code may execute to cause a descriptive icon to be displayed based on the specified configuration. In other embodiments, the generation code may execute in response to a given input, but the design-time behavior code may not execute, or vice versa.

Referring again to FIG. 28, the arrows returning from 455 and 457 to 453 indicate that 453, 455, and 457 may be performed repeatedly.

It is noted that FIG. 28 represents one embodiment of a method for creating a graphical program that utilizes an I/O node, and variations of the method are contemplated. For example, in various embodiments, the generation code may be operable to programmatically generate execution-time code for the I/O node based on or in response to any of various other events, conditions, or information besides input received to edit the graphical program. Similarly, the design-time behavior code may also be operable to affect design-time behavior of the I/O node based on or in response to factors other than input received to edit the graphical program.

For example, in one embodiment the method may comprise determining code generation dependency information, wherein the generation code is operable to generate or modify the execution-time code for the I/O node based on or depending on the code generation dependency information. In various embodiments, the code generation dependency information may include information of any kind and from any source. For example, the code generation dependency information may be associated with one or more of: a state of the graphical program; a state of the I/O node or another node in the graphical program; a state of a graphical programming development environment application used to create the graphical program; etc.

As one example, the graphical programming development environment may allow the user to set options regarding a computing platform on which the graphical program is intended to execute. Thus, execution-time code for the I/O node may be generated differently depending on the target platform. For example, if the graphical program will execute on an FPGA device, the execution-time code may be generated in such a way as to facilitate the graphical program to execute efficiently when deployed on the FPGA device.

In other embodiments, the code generation dependency information may include information determined from a source external to the graphical program and external to a graphical programming development environment application used to create the graphical program. For example, the code generation dependency information may be received from a second application external to the graphical programming development environment application, such as another programming environment application or another type of application. As another example, the code generation dependency information may be received from a computer server via a network. For example, the computer server may provide information to allow the execution-time code of the I/O node to be updated periodically, e.g., to extend the functionality of the I/O node or to provide bug fixes.

As another example of code generation dependency information, the generation code may be operable to programmatically generate or modify execution-time code for the I/O node based on the user's history of using the I/O node. For example, when the I/O node was previously used in a first graphical program, the user may have utilized a configuration user interface to configure the I/O node as described above, and execution-time code may have been dynamically generated based on the user's input. The configuration information specified by the user may be stored such that when the user later includes the I/O node in a second graphical program, the I/O node is automatically configured as in the first graphical program, and execution-time code for the I/O node in the second graphical program may be programmatically generated identically as in the first graphical program. Also, separate history information may be maintained for different users, e.g., so that the I/O node may behave differently when different users are creating graphical programs.

Also, in one embodiment the generation of the execution-time code may depend on input received from other sources besides a user. For example, the above-incorporated patent application titled, "System and Method for Programmatically Generating a Graphical Program in Response to Program Information" discloses a method in which a client application may programmatically specify the creation of a graphical program. Thus, for example, a server application may programmatically create the graphical program based on input received from the client application. Where the client application specifies the inclusion of an I/O node in the graphical program, the execution-time code for the I/O node may be dynamically generated based on other information specified by the client application, such as other nodes specified for inclusion in the graphical program, data types of inputs specified for connection to the I/O node's input terminals, etc.

The design-time behavior code may also execute in response to factors other than input to edit the graphical program. For example, the design-time behavior code may be operable to affect design-time behavior of the I/O node based on design-time behavior information, wherein the design-time behavior information may include information of any kind and from any source. As one example, the design-time behavior information may be received from a second application external to the graphical programming development environment application used to create the graphical program. For example, the user may use an external application to configure hardware devices coupled to the computer system. For example, if a data acquisition (DAQ) device is coupled to the computer system, the user may create various named channels referencing the device. Thus, if the I/O node is designed to perform a DAQ-related function, then the design-time behavior code associated with the I/O node may be operable to determine the channel information and affect design-time behavior of the I/O node in various ways based on the channel information. For example, if the user specifies an invalid channel as an input to the I/O node, the design-time behavior code may be operable to alert the user of this error, e.g., by affecting the appearance of the I/O node or otherwise drawing the user's attention.

In various embodiments, multiple I/O nodes may be included in a graphical program, and the I/O nodes may interact with each other in various ways. As one example, a pair of I/O nodes may perform a function together, and changing one of the I/O nodes may affect the other. For example, if the user utilizes a configuration user interface to re-configure one of the I/O nodes, then the execution-time code for both of the I/O nodes may be re-generated in response.

It is noted that the above examples of the generation code programmatically generating or modifying execution-time code for the I/O node are intended to be exemplary only, and many other possible uses of the generation code are contemplated. Similarly, the above examples of the design-time behavior code affecting behavior of the I/O node are intended to be exemplary only, and many other possible uses of the design-time behavior code are contemplated.

Figure 29:
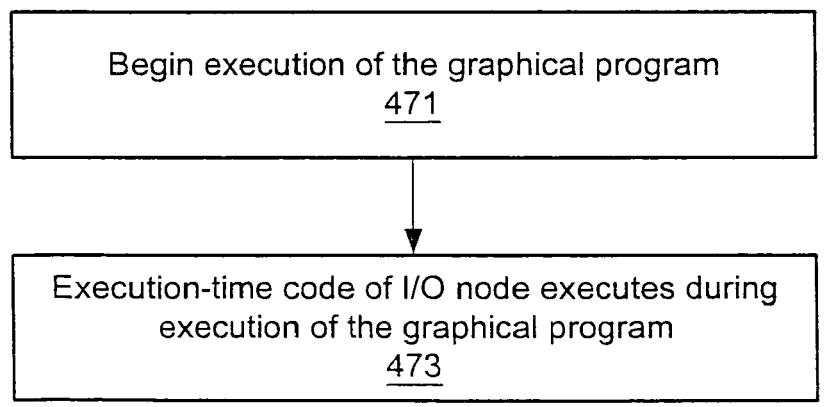
FIG. 29 is a flowchart diagram illustrating one embodiment of a method for executing a graphical program that includes an I/O node.

FIG. 29—Executing a Graphical Program that Includes an I/O Node

FIG. 29 is a flowchart diagram illustrating one embodiment of a method for executing a graphical program that includes a input/output (I/O) abstraction node. It is noted that FIG. 29 illustrates a representative embodiment, and alternative embodiments are contemplated. Also, various steps may be combined, omitted, or performed in different orders.

In 471, the graphical program may begin execution. The graphical program may be executed on any kind of computer system(s) or (re)configurable hardware.

In 473, the execution-time code of the I/O node in the graphical program may be executed, wherein the execution-time code was programmatically generated or modified by generation code associated with the I/O node, as described above with reference to FIG. 28.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for creating a first graphical program, the method comprising:
   utilizing a computer to perform:
      receiving first user input specifying a target device for the first graphical program, wherein the first graphical program comprises a plurality of interconnected nodes that visually indicate functionality of the first graphical program;
      displaying a first I/O node in the first graphical program in response to second user input, wherein the first I/O node includes associated generation code for automatically generating execution-time code associated with the first I/O node;
      receiving third user input specifying at least one I/O resource of the target device, wherein the third user input specifying at least one I/O resource of the target device assigns an alias to the first I/O node, wherein the alias indicates the specified I/O resource and further indicates an assigned one of a plurality of I/O configurations, each specifying a respective configuration of the specified I/O resource;
      configuring the first I/O node to perform an I/O operation via the specified at least one I/O resource during execution of the first graphical program;
      modifying an appearance of the first I/O node to reflect said configuring, wherein the modified appearance of the first I/O node indicates a type of the at least one I/O resource; and
      the generation code associated with the first I/O node executing to automatically generate first execution-time code based on the specified at least one I/O resource and the indicated I/O configuration, wherein the automatically generated first execution-time code is associated with the first I/O node in the first graphical program, and wherein the automatically generated first execution-time code is executable to provide I/O to or from the at least one I/O resource.

2. The computer-implemented method of claim 1, further comprising:
   utilizing the computer to perform:
      wherein the second user input specifies an I/O node type;
      wherein the at least one I/O resource is in accordance with the specified I/O node type.

3. The computer-implemented method of claim 1, further comprising:
   utilizing the computer to perform:
      executing the first graphical program, including executing the first I/O node, wherein said executing the first I/O node includes executing the first execution-time code.

4. The computer-implemented method of claim 1, further comprising:
   utilizing the computer to perform:
      receiving further user input specifying a second at least one I/O resource; and
      the generation code associated with the first I/O node automatically generating second execution-time code based on the further user input;
      wherein the second execution-time code is associated with the first I/O node in the first graphical program in place of the first execution-time code; and wherein the automatically generated second execution-time code is executable to provide I/O to or from the second at least one I/O resource.

5. The computer-implemented method of claim 1, wherein the generation code is configured to automatically generate different types of execution-time code having different functionality for the first I/O node depending upon the target device and I/O resources specified.

6. The computer-implemented method of claim 1, wherein the generation code executes to automatically generate the first execution-time code in response to input received to edit the first graphical program.

7. The computer-implemented method of claim 1, wherein the generation code executes to automatically generate the first execution-time code when compiling the graphical program.

8. The computer-implemented method of claim 1, wherein the first I/O node does not have any associated execution-time code when the first I/O node is displayed in the first graphical program; and
wherein said automatically generating the first execution-time code comprises creating execution-time code for the first I/O node.

9. The computer-implemented method of claim 1, wherein the first I/O node has initial associated execution-time code when the first I/O node is displayed in the first graphical program; and
wherein said automatically generating the first execution-time code comprises replacing or modifying the initial execution-time code with the first execution-time code.

10. The computer-implemented method of claim 1, the method further comprising:
utilizing the computer to perform:
receiving user input modifying one or more of:
the alias referenced by the I/O node;
which I/O configuration is assigned to the specified alias;
the I/O configuration assigned to the specified alias; or
which at least one I/O resource is indicated by the alias;
the generation code associated with the first I/O node executing to automatically generate second execution-time code based on the received user input, wherein the second execution-time code replaces the first execution-time code.

11. The computer-implemented method of claim 1, wherein the at least one I/O resource corresponds to an entry in a hardware database, wherein the hardware database comprises a plurality of entries corresponding to I/O resources of a plurality of respective hardware devices.

12. The computer-implemented method of claim 11, wherein at least one of the respective hardware devices is comprised on a processor, and is only accessible inside the processor.

13. The computer-implemented method of claim 11, wherein at least one of the respective hardware devices is comprised on a programmable hardware element, and is only accessible inside the programmable hardware element.

14. The computer-implemented method of claim 1, wherein the graphical program comprises a graphical data flow program.

15. The computer-implemented method of claim 1, wherein the first I/O node further includes associated design-time behavior code configured to affect design-time behavior of the first I/O node, the method further comprising:
utilizing the computer to perform:
the design-time behavior code associated with the first I/O node executing to affect design-time behavior of the first I/O node in response to the first input.

16. The computer-implemented method of claim 15, wherein the design-time behavior code is executable to:
affect the appearance of the node within the graphical program in response to receiving input to edit the graphical program; or
affect a user's experience of interacting with the first I/O node when editing the first graphical program.

17. The computer-implemented method of claim 1, wherein the execution-time code comprises one or more of:
a software program stored in a memory and executable by a processor; and
a hardware configuration program useable for configuring a programmable hardware element.

18. A computer-accessible memory medium that stores program instructions executable by a processor to implement:
an I/O abstraction node for use in a graphical program comprising a plurality of interconnected nodes that visually indicate functionality of the graphical program, the I/O abstraction node comprising:
data specifying an iconic appearance, wherein the data are useable to display an iconic appearance representing the I/O abstraction node in response to including the I/O abstraction node in the graphical program;
one or more input and/or output terminals for connecting the I/O abstraction node to other nodes in the graphical program; and
associated generation code, wherein the generation code is configured to automatically generate execution-time I/O code associated with the I/O abstraction node in the graphical program in response to user input specifying at least one I/O resource of a target device, wherein the user input specifying at least one I/O resource of the target device assigns an alias to the first I/O node, and wherein the alias indicates the specified I/O resource and further indicates an assigned one of a plurality of I/O configurations, each specifying a respective configuration of the specified I/O resource;
wherein the execution-time I/O code is automatically generated based on the indicated specified I/O resource and the indicated I/O configuration, wherein the automatically generated execution-time I/O code is associated with the first I/O node in the graphical program, and wherein the automatically generated execution-time I/O code is executable to provide I/O to or from the at least one I/O resource;
wherein the data specifying the iconic appearance of the I/O abstraction node is modified in response to the user input specifying the at least one I/O resource of the target device, thereby modifying the iconic appearance of the I/O abstraction node to indicate the at least one I/O resource's type; and
wherein once the execution-time I/O code is generated, the first I/O node is configured to perform an I/O operation via the specified at least one I/O resource during execution of the first graphical program.

19. A computer-accessible memory medium that stores program instructions executable by a processor to:
receive first user input specifying a target device for the first graphical program, wherein the first graphical program comprises a plurality of interconnected nodes that visually indicate functionality of the first graphical program;

display a first I/O node in the first graphical program in response to second user input, wherein the first I/O node includes associated generation code for automatically generating execution-time code associated with the first I/O node;

receive third user input specifying at least one I/O resource of the target device, wherein the third user input specifying at least one I/O resource of the target device assigns an alias to the first I/O node, wherein the alias indicates the specified I/O resource and further indicates an assigned one of a plurality of I/O configurations, each specifying a respective configuration of the specified I/O resource;

configure the first I/O node to perform an I/O operation via the specified at least one I/O resource during execution of the first graphical program;

modify an appearance of the first I/O node to reflect said configuring, wherein the modified appearance of the first I/O node indicates a type of the at least one I/O resource; and execute the generation code associated with the first I/O node to automatically generate first execution-time code based on the specified at least one I/O resource and the indicated I/O configuration, wherein the automatically generated first execution-time code is associated with the first I/O node in the first graphical program, and wherein the automatically generated first execution-time code is executable to provide I/O to or from the at least one I/O resource.

* * * * *